US009531197B2

(12) United States Patent
Jung et al.

(10) Patent No.: US 9,531,197 B2
(45) Date of Patent: Dec. 27, 2016

(54) NON-CONTACT POWER TRANSMISSION APPARATUS

(71) Applicant: Intel Corporation, Santa Clara, CA (US)

(72) Inventors: Chun-Kil Jung, Seoul (KR); Yoon-Sang Kuk, Seoul (KR)

(73) Assignee: Intel Corporation, Santa Clara, CA (US)

( * ) Notice: Subject to any disclaimer, the term of this patent is extended or adjusted under 35 U.S.C. 154(b) by 0 days.

(21) Appl. No.: 14/798,440

(22) Filed: Jul. 13, 2015

(65) Prior Publication Data

US 2015/0318715 A1 Nov. 5, 2015

Related U.S. Application Data

(63) Continuation of application No. 13/857,858, filed on Apr. 5, 2013, now Pat. No. 9,269,490, which is a
(Continued)

(30) Foreign Application Priority Data

| Dec. 12, 2008 | (KR) | 10-2008-0126271 |
| Jun. 29, 2009 | (KR) | 10-2009-0058139 |
| Sep. 3, 2009 | (KR) | 10-2009-0082773 |

(51) Int. Cl.
*H01F 38/14* (2006.01)
*H01F 37/00* (2006.01)
(Continued)

(52) U.S. Cl.
CPC ............... *H02J 5/005* (2013.01); *H01F 38/14* (2013.01); *H02J 7/0027* (2013.01); *H02J 7/0044* (2013.01);
(Continued)

(58) Field of Classification Search
CPC ........ H02J 5/005; H02J 7/0027; H02J 7/0044; H02J 7/025; H02J 2007/0001; H01F 38/14; H01F 37/00; H04B 5/0037
(Continued)

(56) References Cited

U.S. PATENT DOCUMENTS

| 6,969,927 B1 | 11/2005 | Lee ................................. 307/32 |
| 7,078,666 B2 | 7/2006 | Tuominien et al. .......... 250/205 |

(Continued)

FOREIGN PATENT DOCUMENTS

| CN | 101147308 A | 3/2008 |
| EP | 1 962 403 A2 | 8/2008 |

(Continued)

OTHER PUBLICATIONS

International Search Report dated Jul. 30, 2010, issued in corresponding International Application No. PCT/KR2009/007430.
(Continued)

*Primary Examiner* — Hal Kaplan
(74) *Attorney, Agent, or Firm* — International IP Law Group, P.L.L.C.

(57) ABSTRACT

A non-contact power transmission apparatus accurately determines the kind of object that is placed on the charging deck of the non-contact power transmission apparatus, and, only when a non-contact power receiving apparatus is placed on the power transmission apparatus, allows power transmission and data communication to take place, thereby accurately determining the state of the receiver side and efficiently controlling the transmission of power. In the power transmission apparatus, the power supplied to the non-contact power receiving apparatus is measured, and the output power of the wireless power signal output from two different cores is controlled, thereby allowing the charging operation to be stably conducted even if the non-contact
(Continued)

power receiving apparatus is moved anywhere on the power transmission apparatus. The power transmission apparatus improves both the reliability of operation of the non-contact charging system, and the competitiveness of related products, such as portable terminals, battery packs and the like.

20 Claims, 21 Drawing Sheets

Related U.S. Application Data continuation of application No. 13/162,861, filed on Jun. 17, 2011, now Pat. No. 8,436,492, which is a continuation of application No. 12/741,534, filed as application No. PCT/KR2009/007430 on Dec. 11, 2009, now Pat. No. 8,552,593.

(51) Int. Cl.
    *H02J 5/00*     (2016.01)
    *H02J 7/00*     (2006.01)
    *H02J 7/02*     (2016.01)
    *H04B 5/00*     (2006.01)

(52) U.S. Cl.
    CPC ............. *H02J 7/025* (2013.01); *H04B 5/0037* (2013.01); *H01F 37/00* (2013.01); *H02J 2007/0001* (2013.01)

(58) Field of Classification Search
    USPC ........................................................ 307/104
    See application file for complete search history.

(56) References Cited

U.S. PATENT DOCUMENTS

| | | | |
|---|---|---|---|
| 7,230,933 B2 | 6/2007 | Bahl et al. | 370/311 |
| 8,004,118 B2 | 8/2011 | Kamijo et al. | 307/104 |
| 8,427,011 B2 | 4/2013 | Jung et al. | 307/104 |
| 2003/0198196 A1 | 10/2003 | Bahl et al. | 370/311 |
| 2004/0266367 A1 | 12/2004 | Tuominien et al. | 455/91 |
| 2007/0090790 A1 | 4/2007 | Hui | 320/108 |
| 2007/0139000 A1 | 6/2007 | Kozuma et al. | |
| 2007/0182367 A1 | 8/2007 | Partovi | 320/108 |
| 2008/0197802 A1 | 8/2008 | Onishi et al. | |
| 2011/0260550 A1 | 10/2011 | Jung et al. | 307/104 |
| 2013/0169060 A1 | 7/2013 | Jung et al. | 307/104 |
| 2014/0021797 A1 | 1/2014 | Jung et al. | 307/104 |

FOREIGN PATENT DOCUMENTS

| | | |
|---|---|---|
| GB | 2 389 720 A | 12/2003 |
| JP | 2001-136667 A | 5/2001 |
| JP | 2001-309579 A | 11/2001 |
| JP | 2002-315209 | 10/2002 |
| JP | 2006-141170 | 6/2006 |
| JP | 2006-230032 | 8/2006 |
| JP | 2008-141816 | 6/2008 |
| JP | 2008-206327 A | 9/2008 |
| KR | 10-2008-0012782 | 2/2008 |
| KR | 10-2008-0032519 | 4/2008 |
| KR | 10-0821885 | 4/2008 |
| WO | 2008050917 A1 | 5/2008 |
| WO | WO 2008/137996 A1 | 11/2008 |
| WO | WO 2010/068062 A2 | 6/2010 |
| WO | WO 2010/068062 A3 | 6/2010 |

OTHER PUBLICATIONS

U.S. Office Action dated Apr. 13, 2012, issued in co-pending U.S. Appl. No. 12/741,534.
U.S. Office Action dated Jun. 17, 2011, issued in co-pending U.S. Appl. No. 13/162,861.
U.S. Office Action dated Jul. 13, 2012, issued in co-pending U.S. Appl. No. 13/162,861.
U.S. Office Action dated Jul. 13, 2012, issued in co-pending U.S. Appl. No. 13/162,886.
Japanese Office Action dated Dec. 4, 2012, issued in corresponding Japanese Patent Application No. 2011-540608.
U.S. Office Action issued by the USPTO on Mar. 20, 2015 for the corresponding U.S. Appl. No. 13/940,648.
Office Action issued by the USPTO on Apr. 28, 2014, for corresponding U.S. Appl. No. 13/923,182.
Chinese Office Action, dated Mar. 13, 2013, issued to the corresponding Chinese Patent Application No. 200980101003.1.
Office Action issued by the Japanese Patent Office on Jan. 7, 2012 for the corresponding Japanese Patent Application No. 2013-041858.
Office Action issued by the Japanese Patent Office on Jul. 22, 2014 for the corresponding Japanese Patent Application No. 2013-041858.
Supplemental European Search Report issued by the EPO on Sep. 9, 2014 for the corresponding EP Patent Application No. 09 825 620.9.
Chinese Office Action issued by SIPO on Sep. 1, 2014 for the corresponding CN Patent Application No. 201310045713.5.
U.S. Appl. No. 12/741,534, filed May 5, 2010, Chun-Kil Jung et al.
U.S. Appl. No. 13/162,861, filed Jun. 17, 2011, Chun-Kil Jung et al.
U.S. Appl. No. 13/162,886, filed Jun. 17, 2011, Chun-Kil Jung et al.
U.S. Appl. No. 13/762,667, filed Feb. 8, 2013, Chun-Kil Jung et al.
U.S. Appl. No. 13/857,858, filed Apr. 5, 2013, Chun-Kil Jung et al.

NON-CONTACT POWER TRANSMISSION APPARATUS

CROSS-REFERENCE TO RELATED APPLICATIONS

This application is a continuation of U.S. application Ser. No. 13/857,858, filed Apr. 5, 2013 in the U.S. Patent and Trademark Office, which is a continuation of U.S. application Ser. No. 13/162,861, filed Jun. 17, 2011, now issued to U.S. Pat. No. 8,436,492 on May 7, 2013 in the U.S. Patent and Trademark Office, which is a continuation of U.S. application Ser. No. 12/741,534, filed May 5, 2010, now issued to U.S. Pat. No. 8,552,593 on Oct. 8, 2013 in the U.S. Patent and Trademark Office, which is a 371 National Stage of PCT Application No. PCT/KR2009/007430, filed Dec. 11, 2009 with the World Intellectual Property Organization. PCT/KR2009/007430 claims priority to Korean Applications Nos. 10-2008-0126271, filed Dec. 12, 2008, 10-2009-0058139, filed Jun. 29, 2009, and 10-2009-0082773, filed Sep. 3, 2009, all in the Korean Intellectual Property Office. The disclosures of all of these applications are incorporated herein by reference.

BACKGROUND OF THE INVENTION

1. Field of the Invention

The present invention relates to a noncontact power transmission apparatus, and more particularly to a non-contact power transmission apparatus for transmitting electric energy in a wireless power transmission manner, which detects an object placed on the charging deck thereof and enables power transmission and data communication only when a non-contact power receiving apparatus is present, thereby accurately perceiving the state of the receiver side and efficiently controlling the power.

2. Description of the Related Art

The Generally, a battery pack is a kind of power supply that is charged with power (electric energy) received from an external charger and supplies the power so that portable electronic devices, such as cellular phones, personal digital assistants (PDAs) and the like can be operated, and consists of a battery cell which is charged with electric energy and circuits for charging and discharging the battery cell (supplying electric energy to portable terminals).

The electrical connection between the battery pack, which is used in the portable terminals, and the charger for charging electric energy to the battery pack may be achieved using a connector supply system, which receives the power from a regular power source and converts the voltage and current thereof to correspond to those of the battery pack, and supplies the electric power to the battery pack via a connector of the corresponding battery pack.

However, such a connector supply system has drawbacks, including instant discharge owing to the difference in potential between the charger connector and the battery connector, the risk of fire and concomitant damage due to fire caused by the presence of foreign substances, reduction in the life and performance of the battery pack, and the like.

To solve the above-mentioned problems, a noncontact charging system and control method thereof using a wireless power transmission system were recently proposed.

This non-contact charging system includes a non-contact power transmission apparatus for wirelessly supplying electric power, a non-contact power receiving apparatus receiving the electric power from the non-contact power transmission apparatus and charging the battery cell with it, and the like.

Meanwhile, due to its non-contact nature, the non-contact charging system conducts a charging operation while the non-contact power receiving apparatus is placed in the non-contact power transmission apparatus.

Here, if foreign substances, such as a metal, are placed in the non-contact power receiving apparatus, the foreign substances cause problems such as abnormal power transmission, product damage due to fire caused by overload or the like.

The information disclosed in this Background of the Invention section is only for the enhancement of understanding of the background of the invention and should not be taken as an acknowledgment or any form of suggestion that this information forms the prior art that would already be known to a person skilled in the art.

SUMMARY OF THE INVENTION

To solve the above-mentioned problems, the present invention is directed to a non-contact power transmission apparatus formed to send out an asking signal via a power transmission coil to identify an object placed thereon, measure the standby time taken up to the time when a response signal is received, and compare the measured standby time with a set reference standby time to rapidly determine whether the object is a foreign substance or a non-contact power receiving apparatus of a battery pack or the like.

Meanwhile, since it is difficult to implement communication using an amplitude shift keying (ASK) method, which determines whether the object placed thereon is a foreign substance such as a metal or a non-contact power receiving apparatus, if the amplitude of a signal is narrow under DC load modulation conditions, it cannot perceive the state of the receiver side and fails to transmit power or control the transmission of power, thereby causing the problem of reduced power transmission efficiency.

To solve this problem, the present invention is directed to a non-contact power transmission apparatus for wirelessly supplying electric power, which, upon ASK data communication with a non-contact power receiving apparatus, which receives the supplied power and charges a battery cell with it, uses Pulse Width Modulation (PWM) for smooth data communication.

Further, the present invention is directed to a non-contact power transmission apparatus using an ASK charging control module, which, even under DC load modulation conditions, accurately perceives the state of the receiver side and efficiently controls the power even when a non-contact power receiving apparatus is moved on the charging deck thereof.

According to an aspect of the present invention, the non-contact power transmission apparatus may include a primary core, which wirelessly sends out a wireless power signal to a non-contact power receiving apparatus having a secondary core, which is operated such that, when a change in the load of the primary core is detected, measures the delay time from the output time of an asking signal, asking what the object on the non-contact power transmission apparatus is, to the time of receipt of a response signal corresponding to the asking signal, the signals being transmitted via the primary core, compares the measured time with a reference standby time, and, if the measured time is shorter than the reference standby time, determines that the object is a foreign substance, and if the measured time is longer than the reference standby time, determines that the object is the normal non-contact power receiving apparatus, signal, and sends out the wireless power.

In particular, the non-contact power receiving apparatus may receive the wireless power signal from the non-contact power transmission apparatus, compare the received signal with a reference voltage, and create a pulse signal based on a duty rate that is set depending upon the comparison result and transmits the created signal to the non-contact power transmission apparatus, which in turn controls the intensity of the transmitted wireless power signal in correspondence with the transmitted pulse signal.

Further, the non-contact power receiving apparatus may include an ID transmitter for transmitting and receiving code data of an AC signal, modulated in an AC modulation manner, via the secondary core, and the noncontact power transmission apparatus may include a feedback circuit unit for extracting the code data of the AC signal from a DC signal applied to the primary core when the code data are received by the primary core.

Preferably, the non-contact power receiving apparatus may include a capacitor, connected in parallel with the power receiving core side of the secondary core to remove a DC signal component.

More preferably, the non-contact power receiving apparatus may further include a MOSFET serially connected with the capacitor, and the ID transmitter inputs the operation voltage of the MOSFET to a gate terminal of the MOSFET in correspondence with the duty rate set depending on the comparison result.

Further, the feedback circuit unit may include an RC filter circuit electrically connected with one end of the primary core to remove the DC signal component, and an amplifying circuit having an OP-AMP electrically connected with the RC filter circuit.

Further, the primary core may include first and second power transmission core sides and has a multilayered structure having an overlapping region in which the first and second power transmission core sides partially overlap each other.

According to another aspect of the present invention, the non-contact power transmission apparatus may include a transmission module having a primary core wirelessly sending out a wireless power signal to a noncontact power receiving apparatus having a secondary core, the transmission module including a body case; a board provided in the body case and having a control module for sending out the wireless power signal; a shielding plate provided on an upper portion of the board; first and second power transmission core sides provided on an upper portion of the shielding plate such that they are electrically connected with the control module, the first and second power transmission core sides partially overlapping each other; a light-emitting device for displaying the charging state provided on a side of the body case such that it is electrically connected with the control module; and a cover, which is coupled to the body case and on which the noncontact power receiving apparatus is placed.

Particularly, at least one of the first and second power transmission core sides may be formed into a bent form and the first and second power transmission core sides are of a multi-layered structure in which the region of the first core side, which overlaps the second core side, is laid on or below the region of the second core side, which overlaps the first core side.

Preferably, the overlapping region may be larger than the width of the wireless power receiving core of the wireless non-contact power receiving apparatus and smaller than the widths of the first and second power transmission core sides.

Further, the transmission module may include a fitting along which another transmission module detachably slides.

Further, the body case may be a support for a monitor.

Further, the transmission module may further include a power cable connected to the power supply port provided in a monitor and through which the power for operating the monitor is supplied.

Preferably, the power cable may be connected to a branching power cable, which supplies a regular power source to the monitor.

Further, the transmission module may include on another side of the body case a connection terminal to be connected to a connection boat for an Optical Disk Drive (ODD) of a monitor, the connection terminal being electrically connected with the control module mounted on the board.

According to the above-mentioned construction, the present invention can accurately determine the kind of object that is placed on the charging deck of the non-contact power transmission apparatus and, only when a non-contact power receiving apparatus is placed on the power transmission apparatus, allows the power transmission and data communication to take place, thereby having the effect of preventing damage by foreign substances from occurring to a device.

Further, even when the amplitude of a signal is small under the loading conditions of DC load modulation, the present invention makes smooth data communication possible, thereby accurately determining the state of the receiver side and efficiently controlling the transmitted power.

Further, the primary core of the non-contact power transmission apparatus, which transmits a power signal using an induced magnetic field, is formed into a thin, planar spiral core structure provided not on a ritz core, but on a PCB core so that it can be easily mounted in a noncontact power transmission apparatus such as a non-contact charger, thereby increasing the ease of adaptation of the primary core to various products. Still further, the primary core is constituted in a multi-layered structure, so that a charging operation can always be carried out regardless of where the non-contact power transmission apparatus, such as a portable electronic device, is moved on the charging deck.

Further, the power supplied to the noncontact power receiving apparatus is measured and the output power of the wireless power signal output from the two different cores is controlled and corrected depending upon the measurement result, thereby allowing the charging operation to be conducted stably.

The methods and apparatuses of the present invention have other features and advantages which will be apparent from or are set forth in more detail in the accompanying drawings, which are incorporated herein, and the following Detailed Description of the Invention, which together serve to explain certain principles of the present invention.

DETAILED DESCRIPTION OF THE EMBODIMENTS

Reference will now be made in detail to various embodiments of the present invention (s), examples of which are illustrated in the accompanying drawings and described below. While the invention (s) will be described in conjunction with exemplary embodiments, it will be understood that the present description is not intended to limit the invention (s) to those exemplary embodiments. On the contrary, the invention(s) is/are intended to cover not only the exemplary embodiments, but also various alternatives, modifications, equivalents and other embodiments, which may be included within the spirit and scope of the invention as defined by the appended claims.

The non-contact power transmission apparatus of the present invention is variously applicable, and preferred embodiments thereof will now be described in detail with reference to the accompanying drawings.

Figure 1:
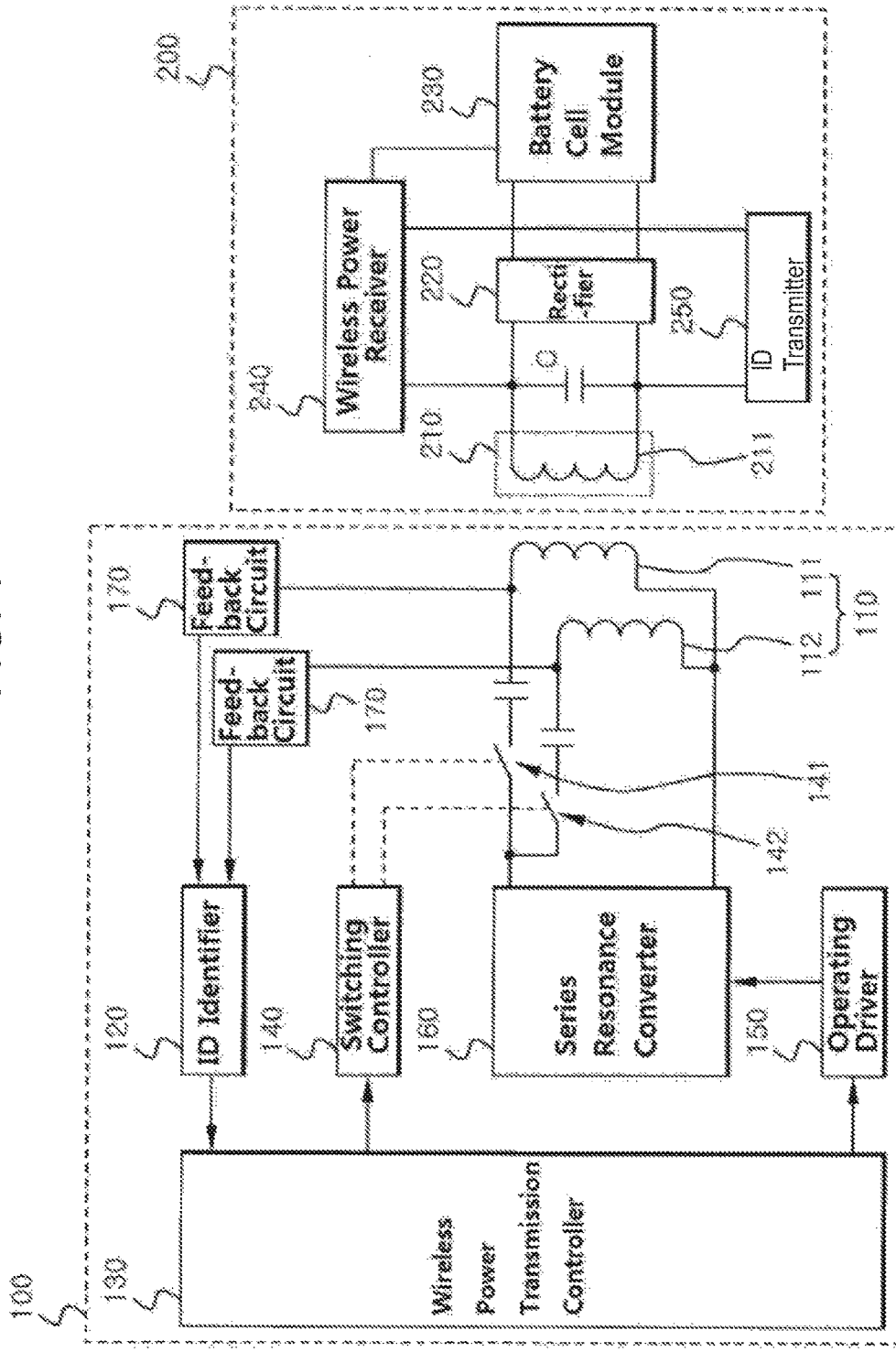
FIG. 1 is a schematic configuration view of a non-contact power transmission apparatus in accordance with the present invention.

FIG. 1 illustrates a wireless power transmission system which includes the non-contact power transmission apparatus 100 of the present invention for sending out a wireless power signal and a non-contact power receiving apparatus 200 receiving the wireless power signal and charging a battery cell with it.

The non-contact power transmission apparatus 100 includes a primary core 110, an identifier 120, a wireless power transmission controller 130, a switching controller 140, an operating driver 150, a series resonance converter 160, and a feedback circuit 170.

The primary core 110 consists of first and second power transmission core sides 111 and 112, which are connected in parallel with the series resonance converter 160.

The identifier 120 detects a change in the load of the primary core 110 and determines whether the change is induced by the non-contact power receiving apparatus 200 or not. Thus, the identifier serves both to detect the change in the load and to analyze and process a data signal code of an AC signal of the signals transmitted from the non-contact power receiving apparatus 200.

The wireless power transmission controller 130 receives and checks the determination result from the identifier 120, and, if the change in the load is induced by the non-contact power receiving apparatus 200, sends out a power control signal to the operating driver 150 via the primary core 110 to transmit the wireless power signal.

Then, the controller 130 analyzes and processes the data signal filtered by the identifier 120 and correspondingly controls the operating driver 150. In addition, the controller creates a data signal (e.g. an ID asking signal) and transmits it to the non-contact power receiving apparatus 200 via the primary core 110.

The switching controller 140 controls the switching operation of first and second switches 141 and 142, which are connected between the series resonance circuit 160 and the first power transmission core side 111 and between the series resonance circuit and the second power transmission core side 112, respectively.

The operating driver 150 controls the operation of the series resonance converter 160 depending upon the intensity of the wireless power signal that is to be transmitted.

The series resonance converter 160 creates a transmission power source for creating a wireless power signal to be transmitted under the control of the operating driver 150, and supplies it to the primary core 110.

That is, when the wireless power transmission controller 130 transmits a power control signal for transmitting a wireless power signal, which has a required power value, to the operating driver 150, the operating driver 150 controls the operation of the series resonance converter 160 to correspond to the transmitted power control signal, and the series resonance converter 160 applies to the primary core 110 a transmission power source, which corresponds to the required power value, under the control of the operating driver 150, thereby transmitting a wireless power signal having the required intensity.

Figure 3:
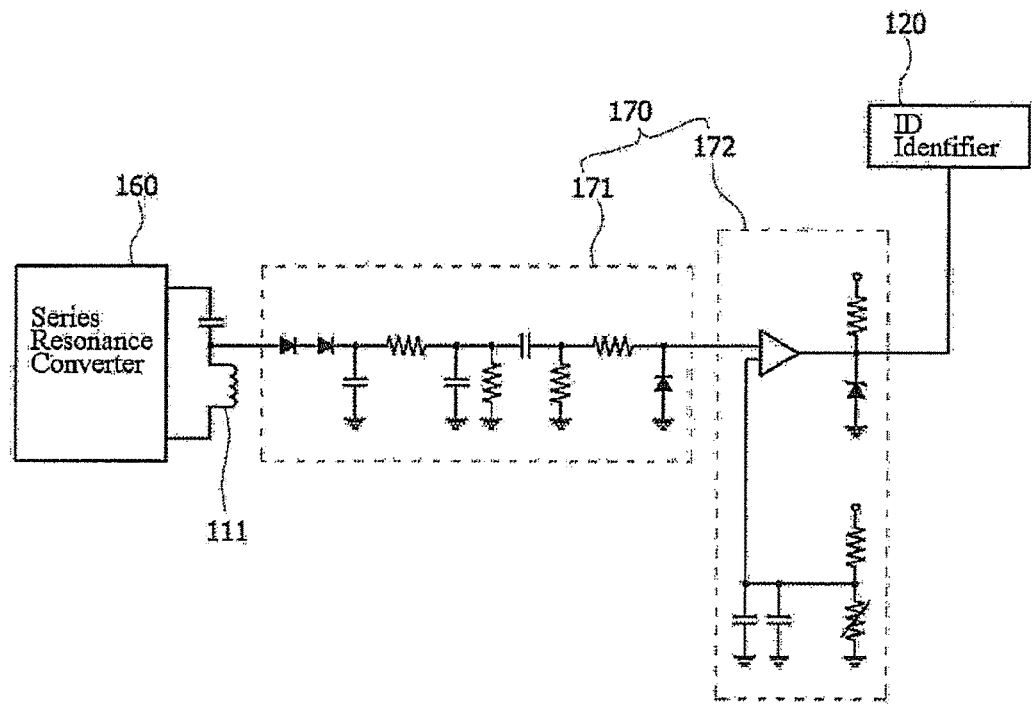
FIG. 3 is a circuit diagram of exemplary major parts of the non-contact power transmission apparatus illustrated in FIG. 1.

When the code data of an AC signal is received by the primary core 110, the feedback circuit 170 extracts the code data of the AC signal from a DC signal applied to the primary core 110. As illustrated in FIG. 3, the feedback circuit 170 includes an RC filter circuit section 171, which is electrically connected with ends of the first and second power transmission core sides 111 and 112 of the primary core 110 to remove a DC signal component (low frequency component), and an amplifying circuit section 172, which has an OP-AMP that is electrically connected with the RC filter circuit section.

That is, the low frequency signal, which is a DC signal component, is removed by the RC filter circuit section 171 and the extracted AC signal component is amplified by the amplifying circuit section.

Thus, it is possible to transmit and receive a low-amplitude signal.

The non-contact power receiving apparatus 200 to be supplied with power by receiving the wireless power signal includes a power receiving core side 211 of a secondary core 210, which creates induced power using the transmitted wireless power signal; a rectifier 220, which rectifies the induced power; and a battery cell module 230, which charges a battery cell with the rectified power.

This battery module 230 includes a protection circuit, such as an overvoltage and overcurrent preventing circuit, a temperature detecting circuit and the like, and a charging management module, which collects and processes information such as the charged state of the battery cell or the like.

The non-contact power receiving apparatus 200 further includes a wireless power receiver controller 240, which checks the current induced to the power receiving core 211 of the secondary core 210 and requests the control of the intensity of a wireless power signal based on the information on the charging of the battery cell, which is collected and processed by the battery cell module 230, and an ID transmitter 250, which, via the secondary core 210, transmits and receives the code data of an AC signal modulated in an AC modulation manner.

Figure 5:
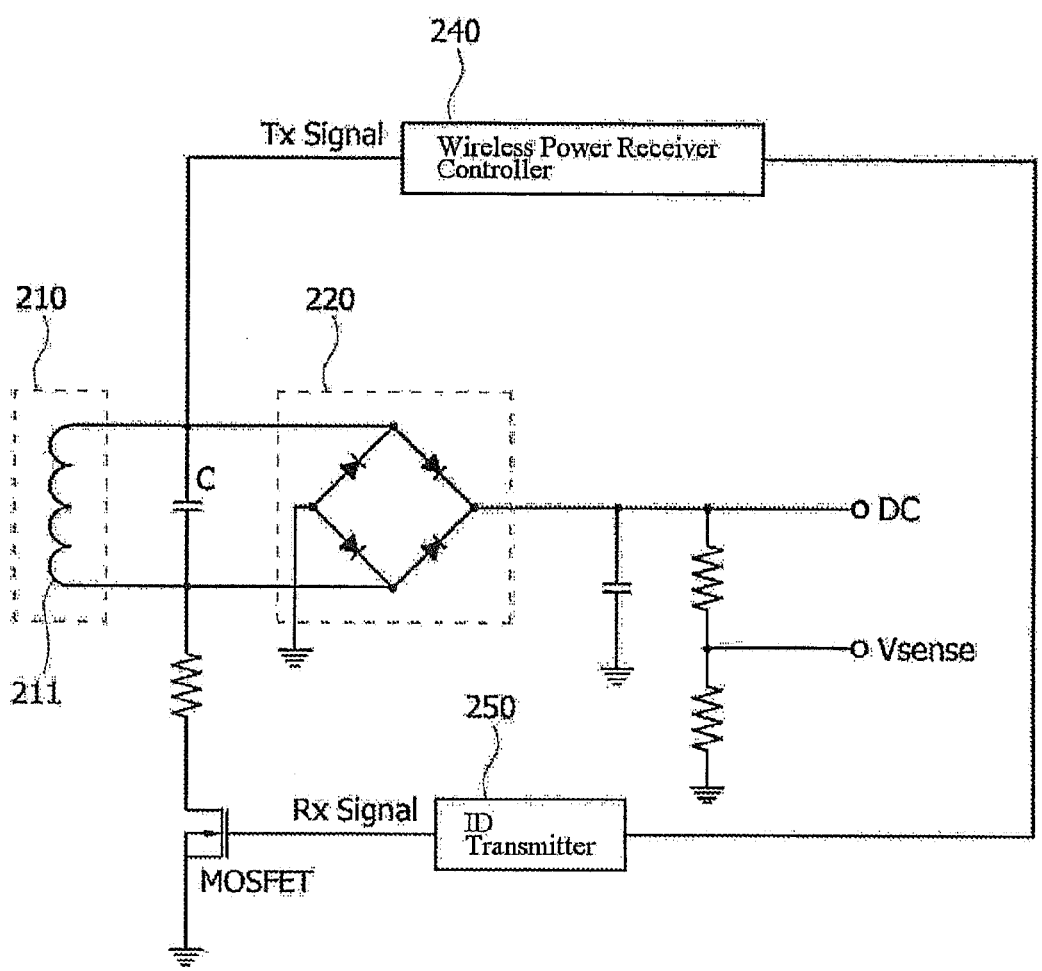
FIG. 5 is a circuit diagram of exemplary major parts of the non-contact power transmission apparatus of FIG. 1.

As illustrated in FIG. 5, the non-contact power receiving apparatus 200 further includes a capacitor C, which is connected in parallel with the power receiving core 211 of the secondary core 210 to remove a DC signal component, and a MOSFET, in which a drain terminal is serially connected with the capacitor.

The MOSFET performs on/off control under the control of the ID transmitter 250. The ID transmitter 250 inputs the operation voltage of the MOSFET to the gate terminal of the MOSFET in correspondence with a duty rate, which is set to correspond to the control request for the intensity of the wireless power signal by the wireless power receiver controller 240.

That is, when the ID transmitter 250 inputs an on-signal and an off-signal, which correspond to the operation voltage, to the gate terminal, the MOSFET creates and outputs a pulse width modulated (PWM) signal corresponding to voltage input to the gate terminal, and the PWM signal is transmitted to the non-contact power transmission apparatus 100 via the power receiving core 211.

Figure 2:
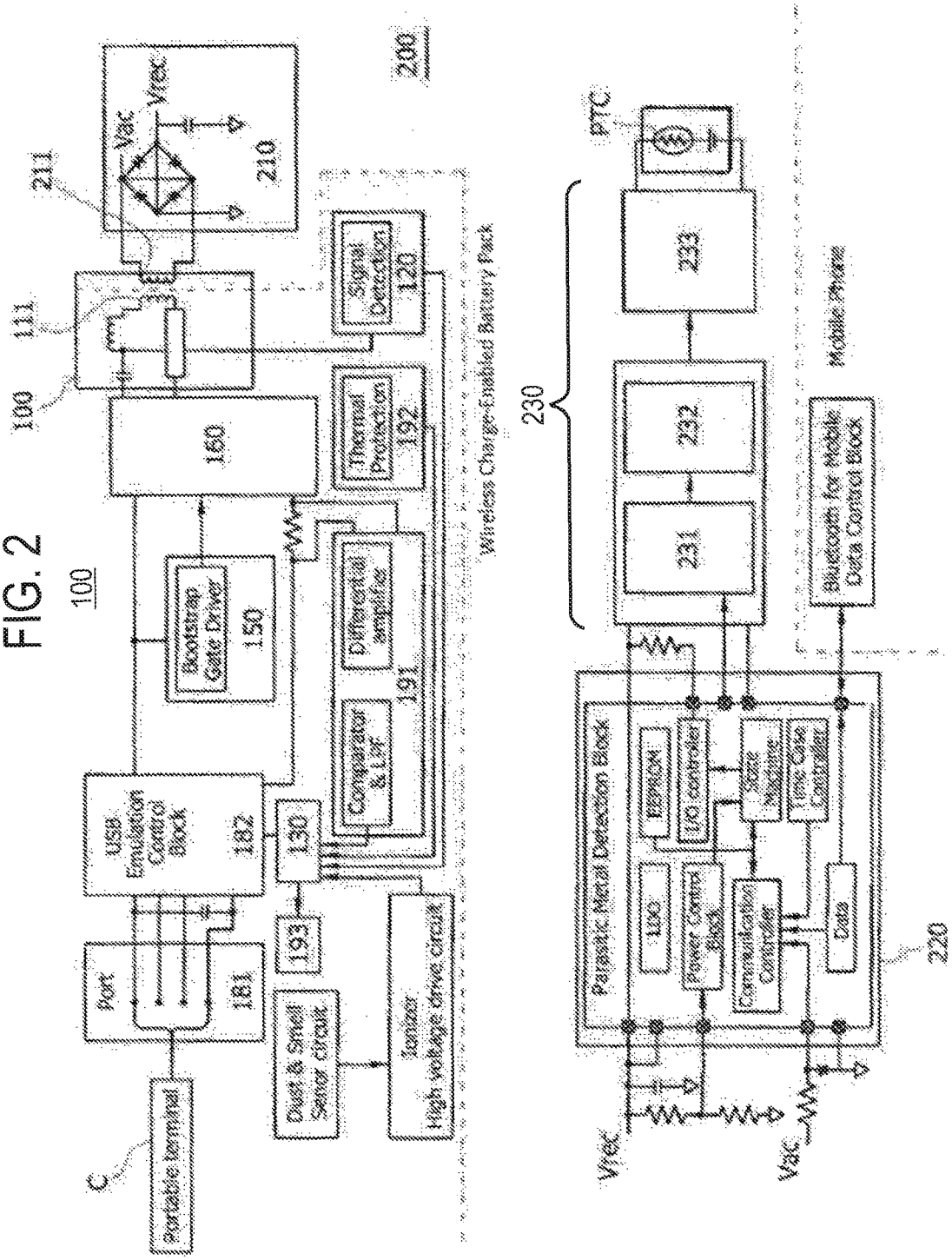
FIG. 2 is a detailed configuration view of another example of a non-contact power transmission apparatus in accordance with the present invention.

The detailed embodiment of the non-contact power transmission apparatus 100 is illustrated in FIG. 2.

In the figure, the non-contact power transmission apparatus 100 is supplied with power, via a power supply port 181, from an adapter supplied with a regular power source, a power source of a USB port of a portable terminal such as a notebook, or the like.

The apparatus 100 further includes a current detector 191 that detects the internal current of the apparatus 100, and a temperature detector 192 that detects the internal temperature of the apparatus 100 during the charging process, so that if overheating, overvoltage or overcurrent occurs, the operation can be stopped.

The battery cell module 230 of the noncontact power receiving apparatus 200 further includes a charging circuit 231 for charging a battery cell, a gauge circuit 232, for checking the charged quantity, and a charging monitoring circuit 233, for monitoring the charging state.

A display 193 is further provided to display the state of operation of the non-contact power transmission apparatus 100 and the charging state of the non-contact power receiving apparatus 200.

The method of charging a non-contact charging system using the core structure for the wireless power transmission will now be described.

Figure 7:
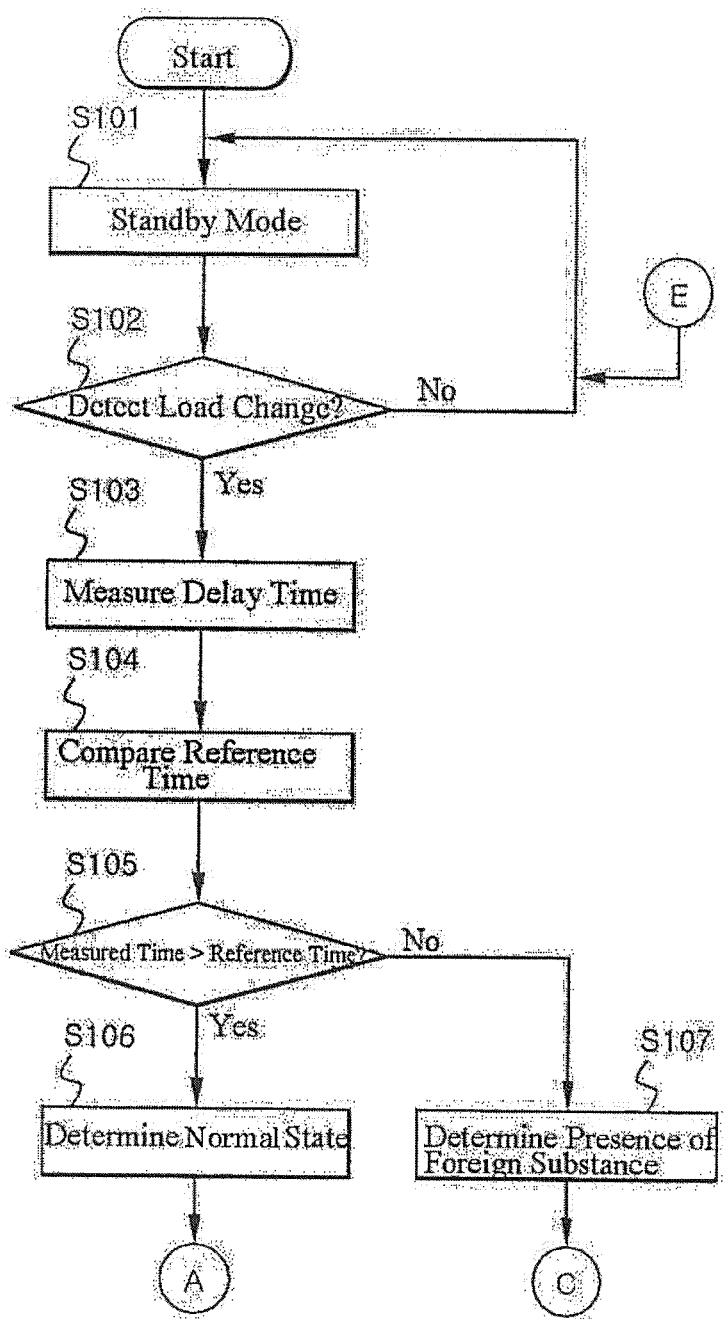
FIGS. 7 to 9 are flow diagrams illustrating exemplary methods of controlling the non-contact power transmission apparatus in accordance with the present invention.
Figure 8:
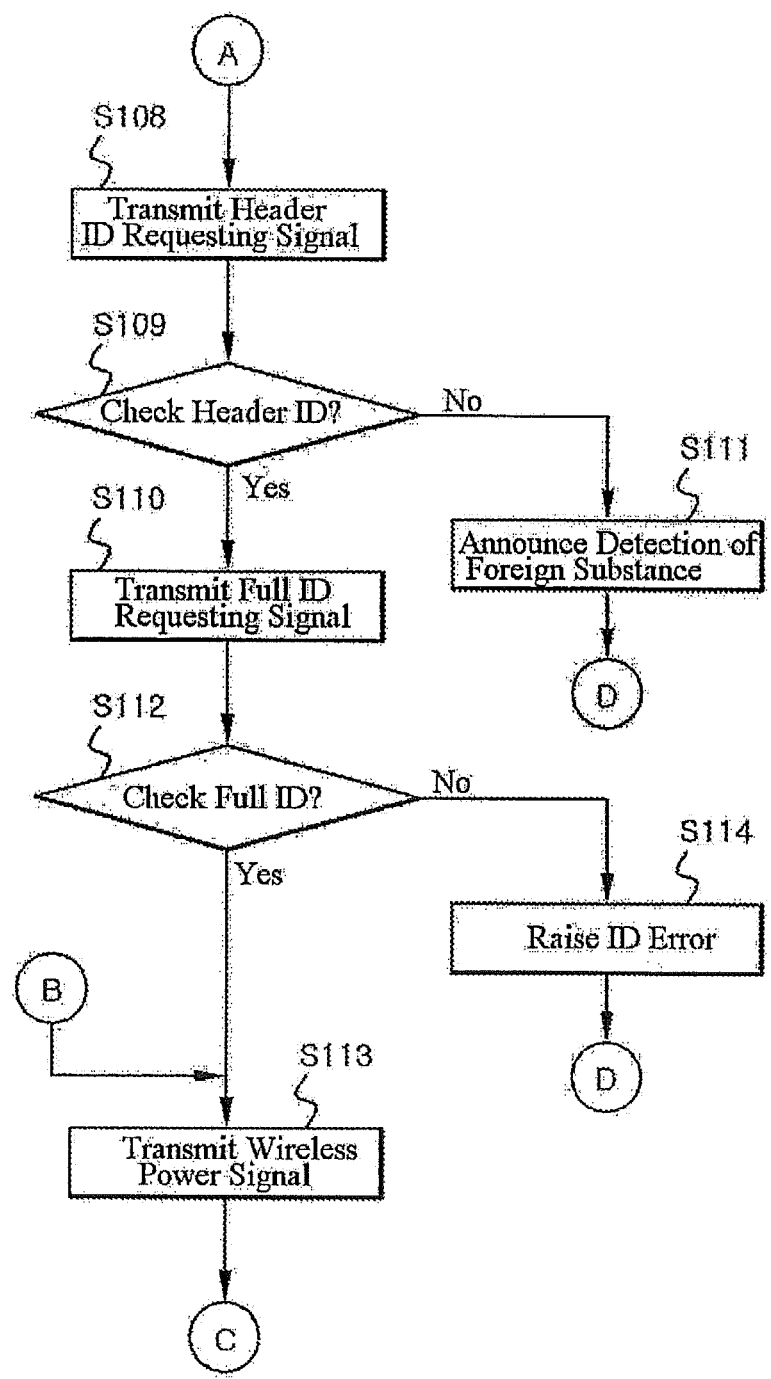
Figure 9:
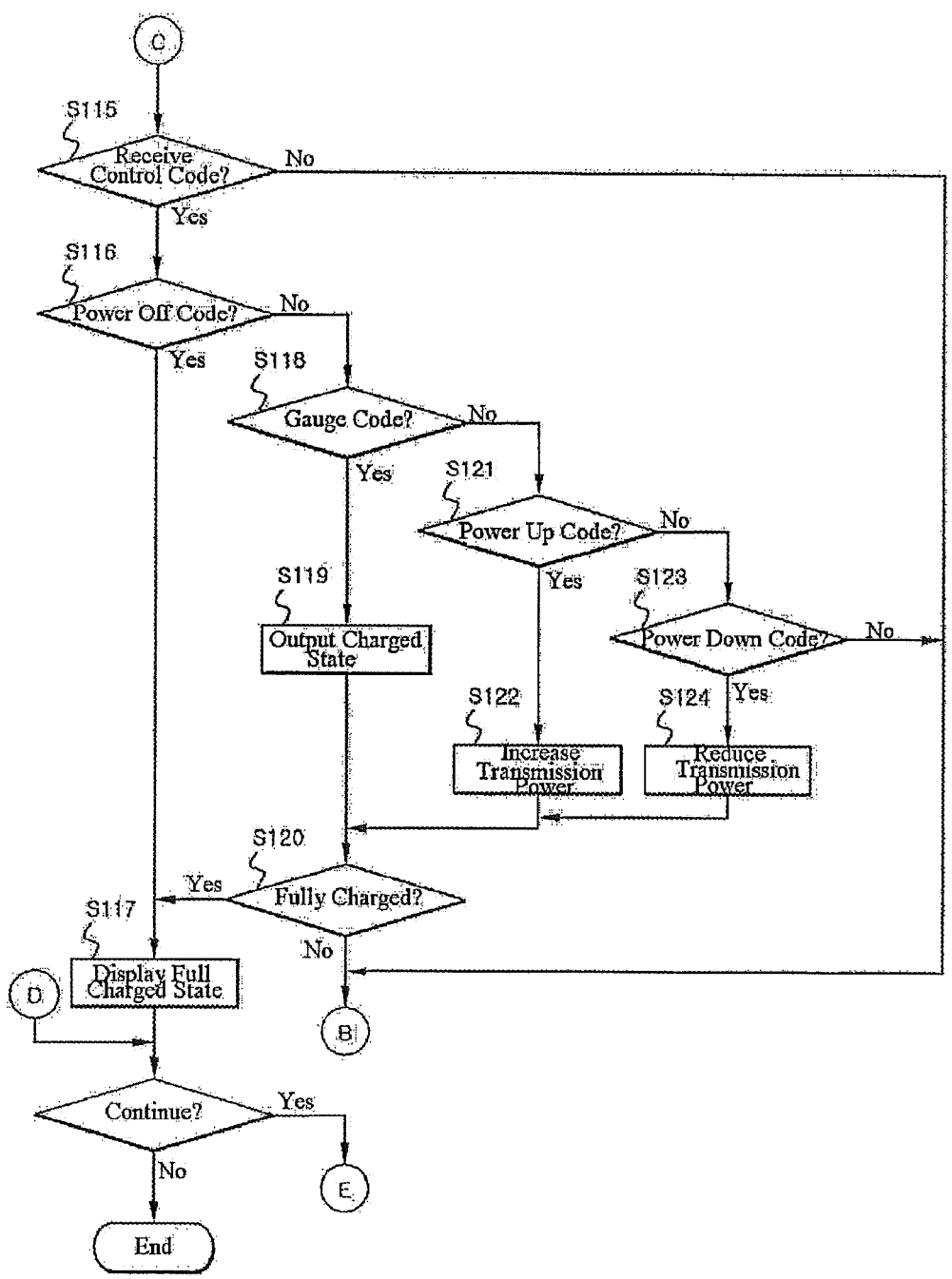

First, the operation of the non-contact power transmission apparatus 100 will be described with reference to FIGS. 7 to 9. A standby mode is maintained, wherein the switching controller 140 of the apparatus 100 keeps the first and second switches 141 and 142 in an OFF state, and the identifier 120 detects the change in load of the first and second power transmission core sides 111 and 112 of the primary core 110 (S101).

In the standby mode S101, when the noncontact power receiving apparatus 200 is placed on the noncontact power transmission apparatus 100, a change in the magnetic field of the first and second power transmission core sides 111 and 112 occurs, and the identifier 120 detects the change (S102).

Figure 4:
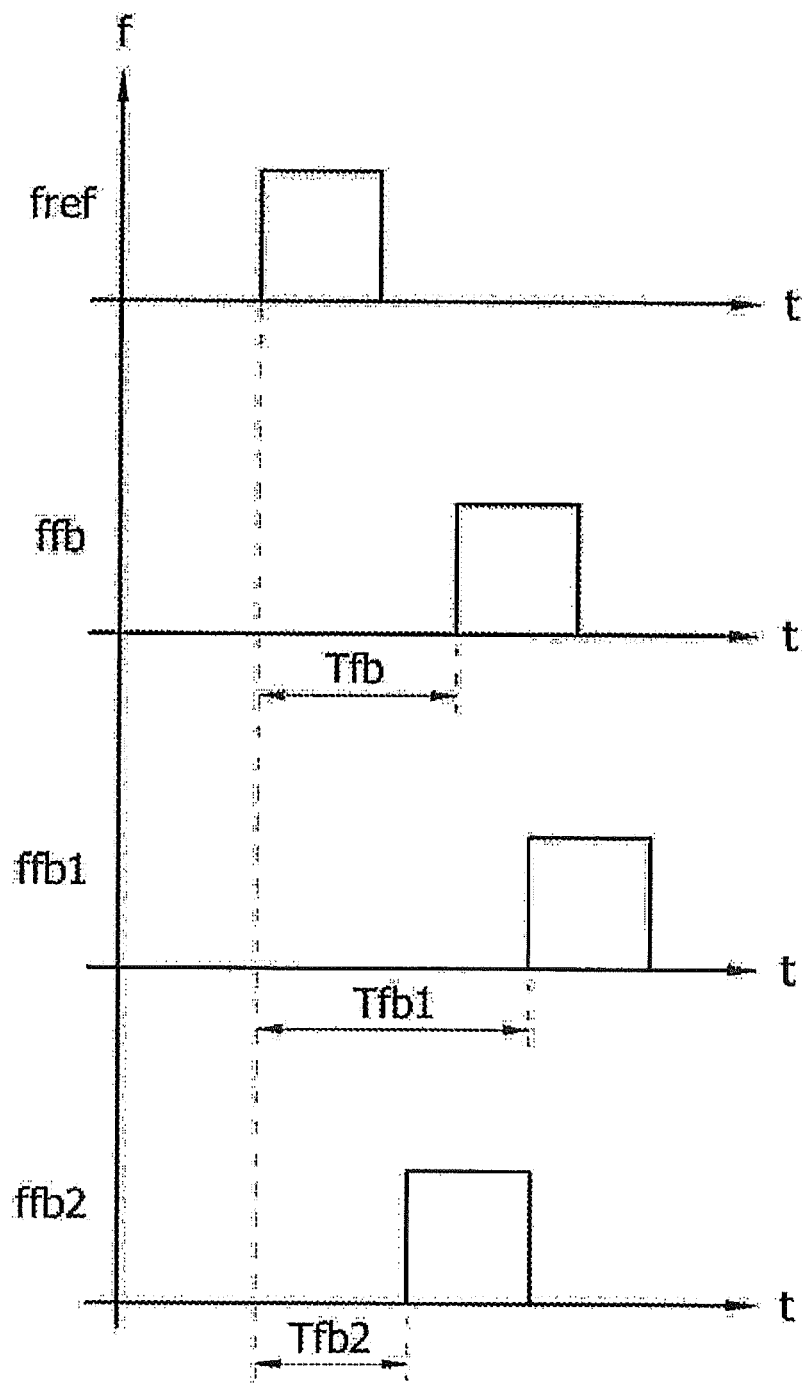
FIG. 4 is a graphical diagram illustrating an exemplary feedback signal which is detected via a primary core and indicates the kind of object placed on the non-contact power transmission apparatus of FIG. 1.

When the change in the load is detected, the identifier 120 informs the wireless power transmission controller 130 of this, and, as illustrated in FIG. 4, the controller 130 measures the delay in the receipt of the response signal (a reflected signal in the case where a foreign substance is present) by the primary core 110 with reference to the transmitted signal fref (S103).

When the delay in the receipt of the response signal is measured, the measured time is compared with a reference time ("Tfb" in FIG. 4) (S104). If the measured time is longer than the reference time (S105) ("Tfb1" in FIG. 4), it is determined that a normal non-contact power receiving apparatus 200 is present (S106), whereas, if the measured time is shorter than the reference time ("Tfb2" in FIG. 4), it is determined that a foreign substance is present (S107).

The determination is a primary determination reference, and the following identification process also helps distinguish between foreign substances and non-contact power receiving apparatus.

When it is first determined that an object is a non-contact power receiving apparatus 200 based on a signal received via the identifier 120, the wireless power transmission controller 130 transmits, via the primary core 110, a signal requesting a header ID (S108).

Here, the header ID means a code on a header of an ID code.

Figure 10:
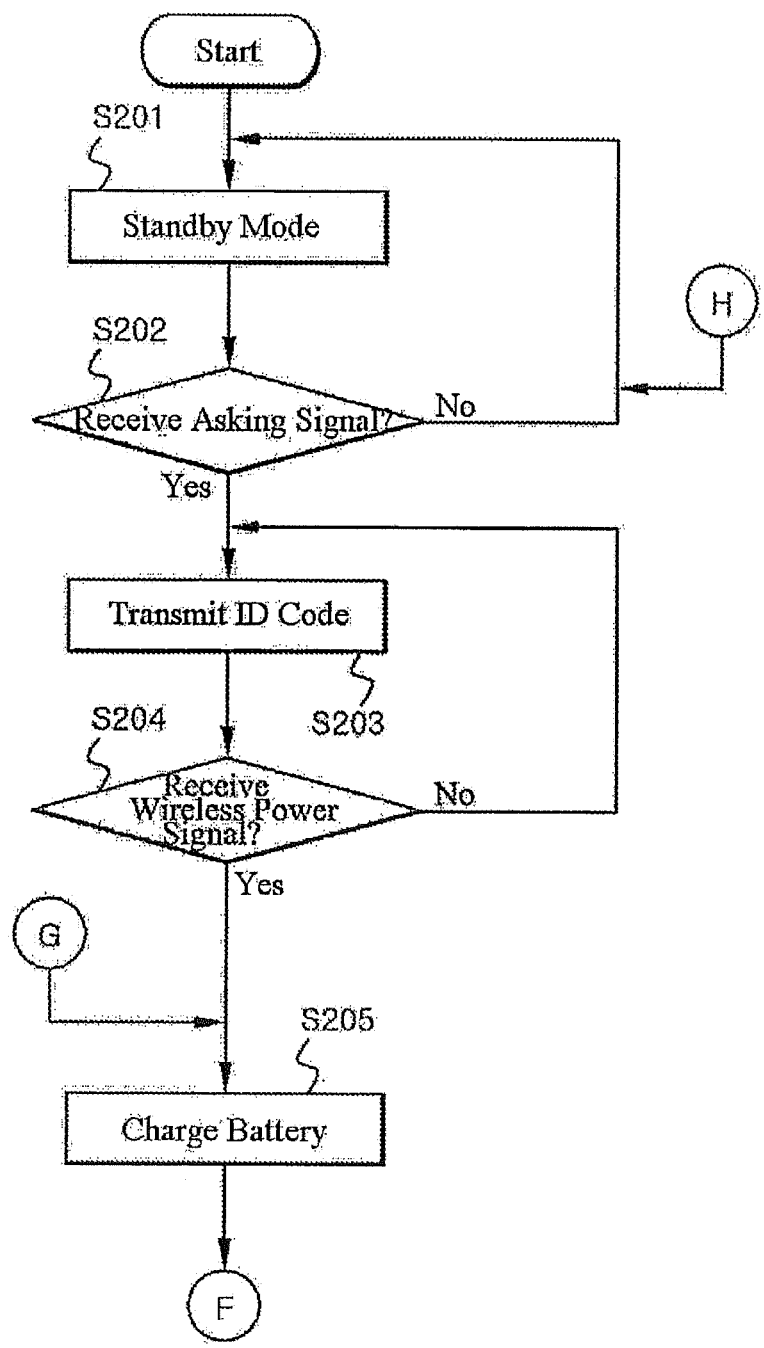
FIGS. 10 and 11 are flow diagrams illustrating exemplary methods of controlling the noncontact power receiving apparatus in accordance with the present invention.

Meanwhile, as illustrated in FIG. 10, in the standby mode for charging a battery cell (S201), when the header ID requesting signal is received (S202), the noncontact power receiving apparatus 200 transmits the header ID code via the power receiving core 211 (S203).

When the header ID code is received in the primary core 110, the identifier 120 determines that the object is the non-contact power receiving apparatus 200, and, if no response signal is received, the identifier determines that the object is a metallic foreign substance (S109).

If the object is determined to be a foreign substance, a user is informed that the foreign substance is detected, using letters or illumination via an output device such as an LCD or an LED (S111). If the object is determined to be a non-contact power receiving apparatus 200, a signal requesting a full ID is transmitted via the primary core 110 (S110).

Here, the full ID means the full code of an ID code.

Meanwhile, in the standby mode for charging a battery cell (S201), when the full ID requesting signal is received (S202), as illustrated in FIG. 10, the non-contact power receiving apparatus 200 transmits the full ID code via the power receiving core 211 (S203).

When the full ID code is received, the identifier 120 checks this (S112). When a normal ID code is received, the identifier transmits a wireless power signal to the non-contact power receiving apparatus 200 (S113).

When the received ID code is not normal, the user is informed of the occurrence of an ID error (S114).

Here, although some of the elements of the non-contact power transmission apparatus 100 to be operated for the transmission of an ID code requesting signal and the reception of a response signal are not explained, they have already been explained through the description of the charging system of the present invention. Further, unnecessarily repetitive explanations will of course be omitted in the following description.

Meanwhile, if an ID code is received by the first power transmission core side 111, the wireless power transmission controller 130 transmits a switching control signal to the switching controller 140 to turn on the first switch 141 and turn off the second switch 142, and transmit the power control signal to the operating driver 150, thereby sending out a wireless power signal via the first power transmission core side 111.

Here, the output power of the transmitted wireless power signal is transmitted corresponding to a reference power value, which corresponds to a voltage which can be induced into the input voltage (e.g. 4.5V to 5.5V) required by the non-contact power receiving apparatus 200.

If an ID code is received to the second power transmission core side 112, the wireless power transmission controller 130 transmits a switching control signal to the switching controller 140 to turn off the first switch 141 and turn on the second switch 142, and transmit the power control signal to the operating driver 150, thereby sending out a wireless power signal via the second power transmission core side 112.

Figure 12:
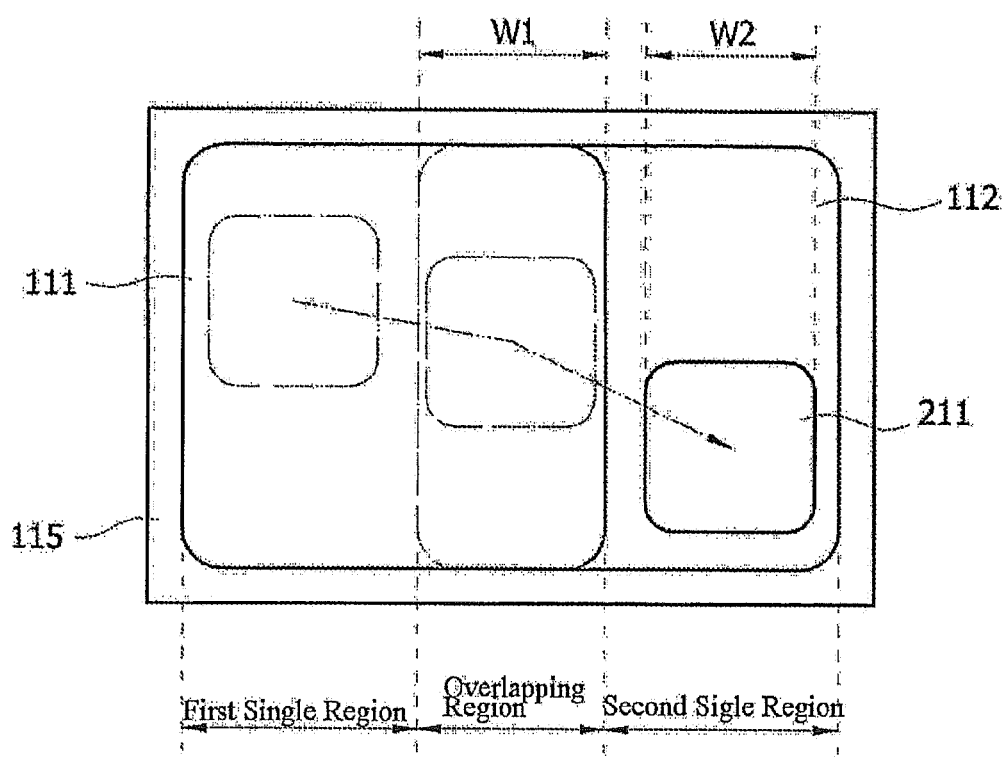
FIG. 12 is a configuration view of the construction of an exemplary primary core of the non-contact power transmission apparatus in accordance with the present invention.

If the power receiving core 211 is positioned in the overlapping region shown in FIG. 12, when the first and second power transmission core sides 111 and 112 receive an ID at the same time, the wireless power transmission controller 130 transmits a switching control signal to the switching controller 140 to turn on the first and second switches 141 and 142 and transmits a power control signal to the operating driver 150, thereby transmitting a wireless power signal via the first and second power transmission core sides 111 and 112.

Here, when the first and second power transmission core sides 111 and 112 respectively transmit the wireless power signal with output power corresponding to a reference power value, excessive voltage can be induced to the power receiving core 211.

Thus, in the case where the first and second power transmission core sides 111 and 112 receive the ID at the same time, it is preferred that the wireless power signal be transmitted while the sum of the output power of the first power transmission core side 111 and the output power of the second power transmission core side 112 is controlled to correspond to the reference power value.

When the wireless power signal is received by the non-contact power receiving apparatus 200 according to the above process (S204), the non-contact power receiving apparatus 200 charges a battery cell using electrical energy induced to the power receiving core 211 (S205).

Figure 11:
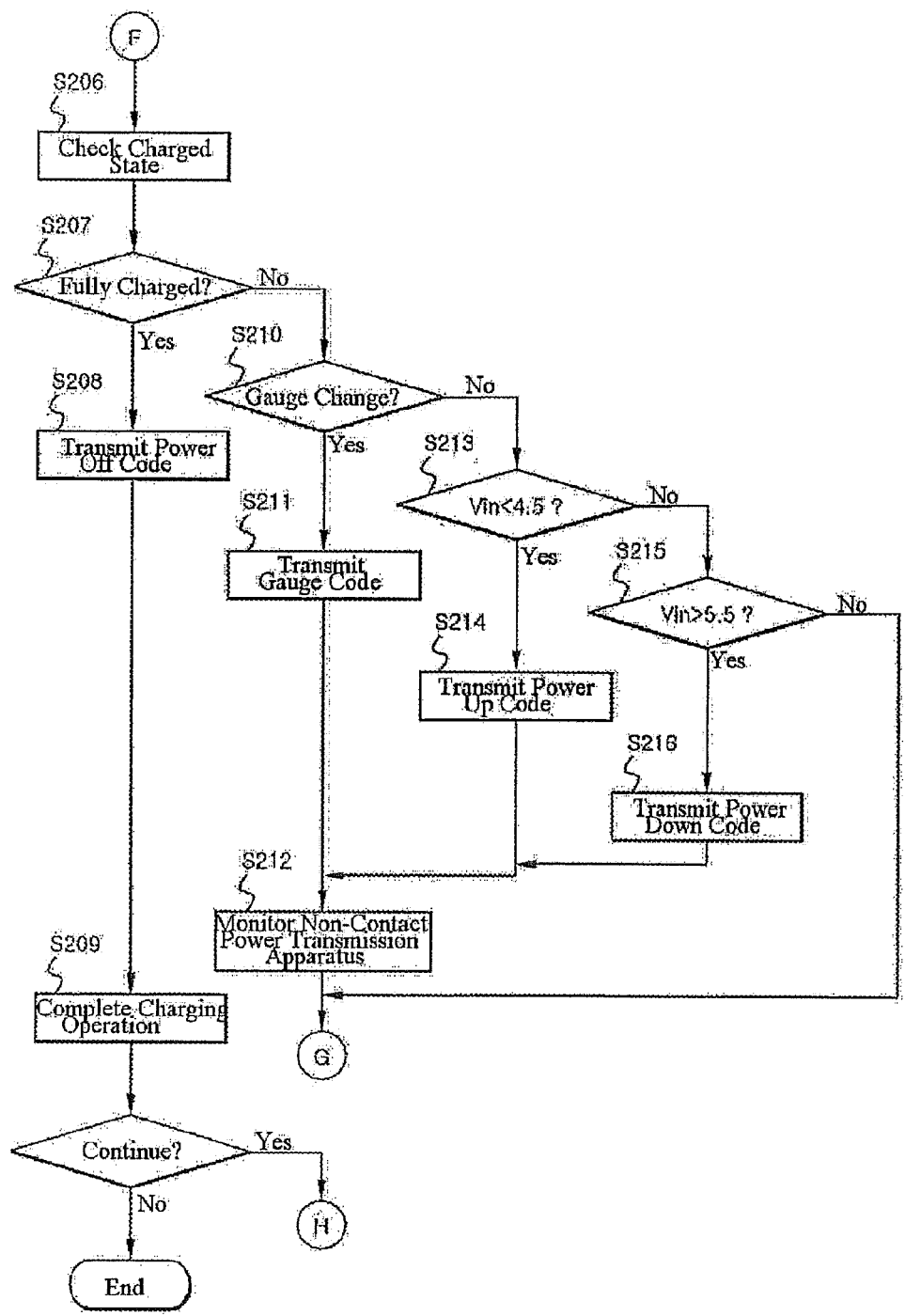

As illustrated in FIG. 11, the non-contact power receiving apparatus 200 checks the charging state of the battery cell (S206) and ascertains whether or not the battery cell is fully charged (S207) and whether or not a gauge has changed (S210). Then, in order to accomplish stable charging, which is an object of the present invention, the apparatus 200 detects voltage induced to the power receiving core 211 and determines if the detected voltage is within the range of the input voltage (e.g. 4.5V to 5.5V) that is required for the charging operation (S213 and S215).

As a result of the checking, if the battery cell is fully charged (S207), the battery cell module 230 transmits, to the non-contact power transmission apparatus 100 via the ID transmitter 240, a power off code, modulated in an AC modulation manner (S208), and terminates the charging operation (S209), and, if the gauge is changed (S210), a gauge code is transmitted (S211).

As a result of the determination, if the induced voltage is not within the set range, the non-contact power receiving apparatus 200 transmits a power control requesting signal to the non-contact power transmission apparatus 100.

Figure 13:
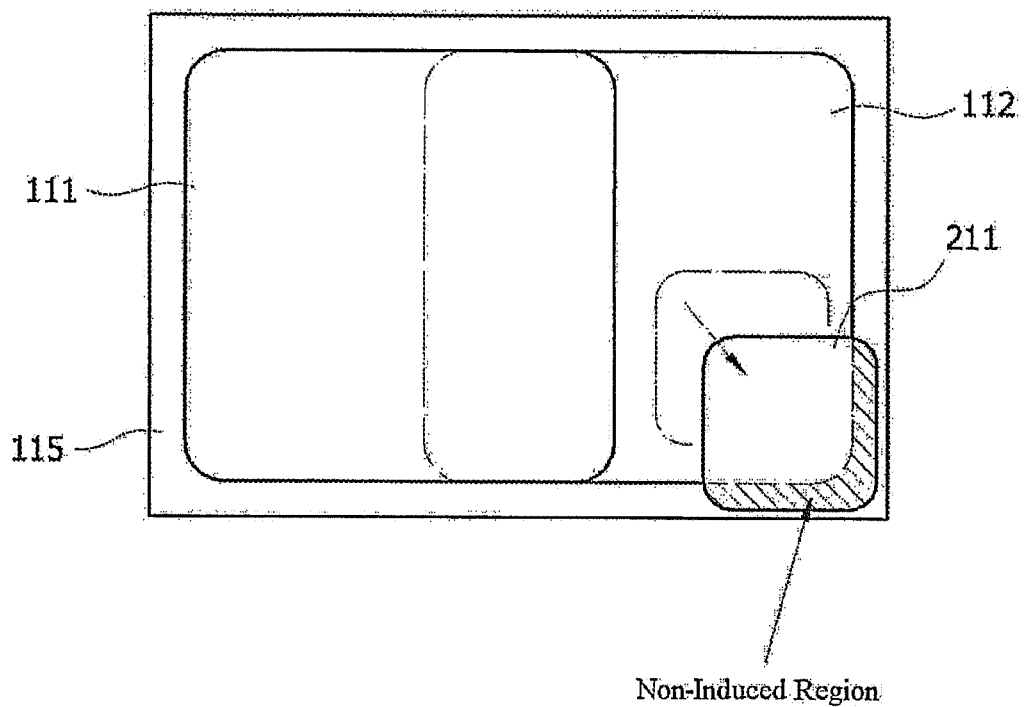
FIG. 13 is a configuration view explaining the step S117 of FIG. 9 and the step S214 of FIG. 11.

For example, as illustrated in FIG. 13, if the power receiving core 211 is moved outside and voltage is induced which is lower than the set range (S213), a power up code is transmitted (S214), and if the power receiving core 211 is positioned in the overlapping region of FIG. 12 and voltage, which is higher than the set range, is induced to the power receiving core 211 by the wireless power signal simultaneously transmitted from the first and second power transmission core sides 111 and 112 (S215), a power down code is transmitted (S216).

When the respective codes are transmitted as such, the non-contact power receiving apparatus 200 monitors the intensity and other characteristics of the wireless power signal transmitted from the non-contact power transmission apparatus 100 (S212).

When the power control code is received by the primary core 110 of the non-contact power transmission apparatus 100 (S115), the feedback circuit 170 extracts a corresponding code from a signal (a transmitted power signal of a DC component and a code signal of a received AC component) induced to the primary core (110).

The wireless power transmission controller 130 receives and analyzes the extracted code, and if the code is the power off code (S116), or if the battery is fully charged (S120), the wireless power transmission controller 130 displays a fully charged state via LED or LCD ((S117). If the code is the gauge code (S118), the charging state is output (S119); if the code is the power up code (S121), the output power of the corresponding power transmission core is increased (S122); and if the code is the power down code (S123), the output power of the corresponding power transmission core is reduced (S124).

Figure 6:
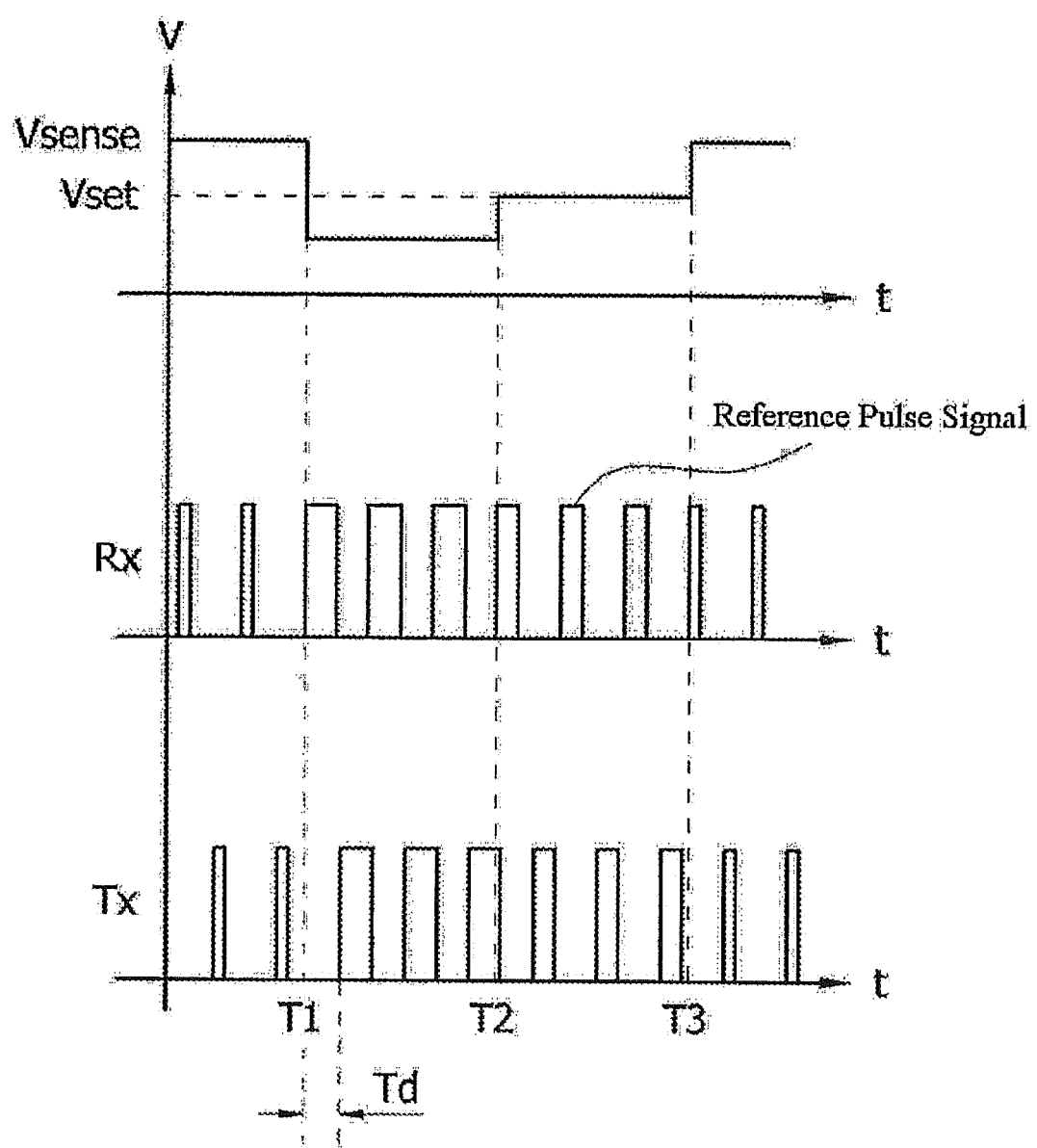
FIG. 6 is a graphical diagram illustrating a charging voltage of the non-contact power receiving apparatus of FIG. 1 and exemplary transmitted/received signals for controlling charging.

For example, as illustrated in FIG. 6, if sensing voltage (Vsense in FIG. 5) branching from a voltage (DC in FIG. 5) for charging a battery cell is lower than a reference voltage (Vset), the ID transmitter 250 inputs a pulse signal with a duty rate that is larger than a duty rate corresponding to the reference voltage, to the gate terminal of the MOSFET. The MOSFET creates a power up code and transmits it to the non-contact power transmission apparatus 100 while performing ON and OFF operations in correspondence with the pulse signal input to the gate terminal, and a wireless power signal to be transmitted is received to the wireless power receiver controller 240 after the delay time (Td) passes.

Here, 'Tx' and 'Rx' in FIG. 5 indicate the transmission and reception of a signal from and to the noncontact power transmission apparatus 100.

The wireless power transmission controller 130 of the non-contact power transmission apparatus 100 calculates a corrected power value corresponding to the received power control requesting signal (respective core signals), applies the corrected power value to the reference power value and transmits a wireless power signal via at least one of the first and second power transmission core sides 111 and 112, so that stable charging can be performed irrespective of the position of the non-contact power receiving apparatus 200.

Meanwhile, the primary core 110 of the noncontact power transmission apparatus 100 transmitting a wireless power signal using a wireless power transmission method, as shown in FIG. 12, comprises the first and second power transmission core sides 111 and 112 and a shielding section 115. FIG. 12 illustrates that the power receiving core 211 of the secondary core 210 is moved on the first and second power transmission core sides 111 and 112.

The first and second power transmission core sides 111 and 112 are formed in a PCB pattern type, and include a first single region, which belongs only to the first power transmission core side 111, a second single region, which belongs only to the second power transmission core side 112, and an overlapping region, where the first and second power transmission core sides 111 and 112 overlap each other.

Thus, even when the power receiving core 211 of the secondary core 210 is moved, as shown in FIG. 12, power can be continuously supplied.

Further, it is preferred that the width W1 of the overlapping region where the first and second power transmission core sides 111 and 112 overlap each other be set greater than the width W2 of the power receiving core 211, so that even when the power receiving core 211 is moved, it remains within the receiving range of the wireless power signal by the first or second power transmission core sides 111 or 112.

Meanwhile, the shape and construction of the above-mentioned primary core 110 and the first and second power transmission core sides 111 and 112 may be variously modified by a person skilled in the art.

Figure 14:
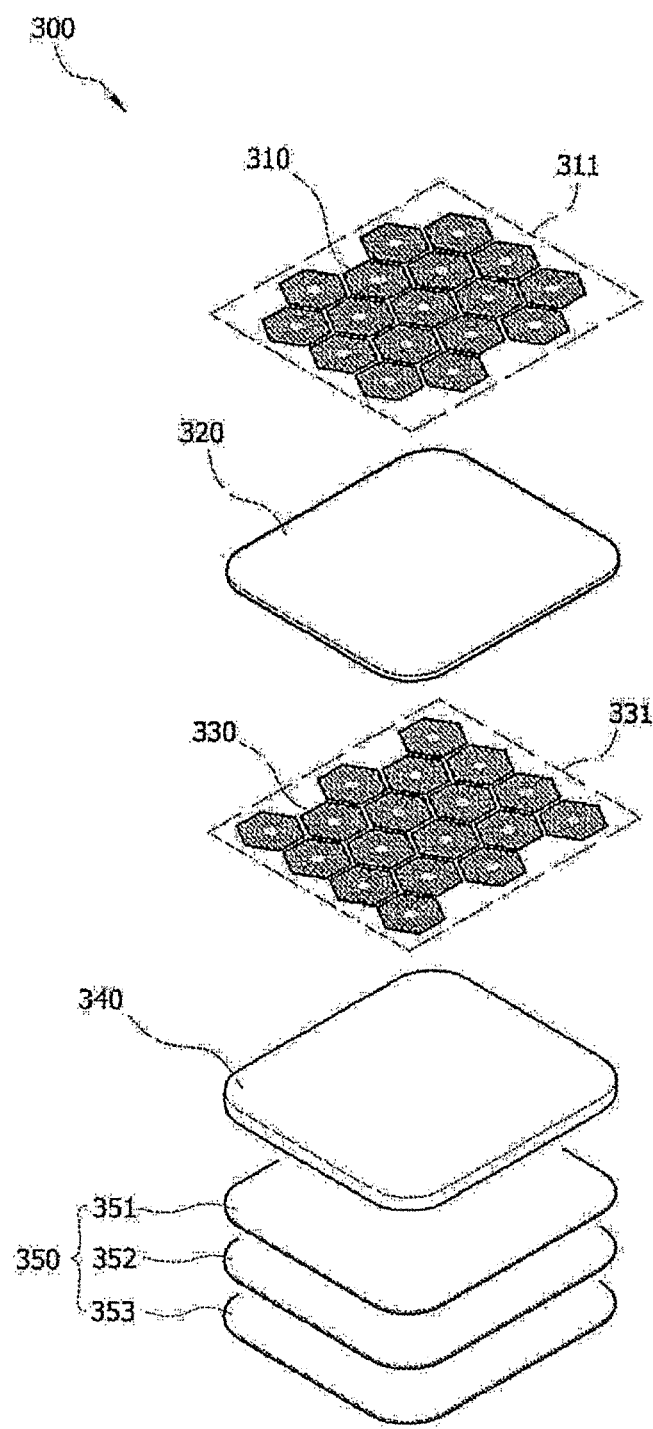
FIG. 14 is a configuration view of the construction of another exemplary primary core of the non-contact power transmission apparatus in accordance with the present invention.

For example, the power transmission core 300 of the primary core shown in FIG. 14 may include a double-structured induction section (no reference number) of upper and lower core layers 310 and 330 on a PCB base 340.

The induction section comprises a power transmission (PT)-PCB core having a planar spiral core structure (PSCS). That is, the PT-PCB core is formed such that a single-layered or multi-layered copper planar spiral core is formed on a PCP (PCB having a Copper Clad Laminate (CCL), Flexible CCL (FCCL) or the like).

The upper and lower core layers 310 and 330 are each composed of upper unit cores 311 and lower unit cores 331. The unit cores may be modified into structures such as a circle, an oval, a triangle, a rectangle, a polygon or the like by a person skilled in the art. In FIG. 14, a pentagonal core structure is illustrated.

The upper and lower unit cores 311 and 331 are composed of copper, and a PSR coating layer 320 is formed between the upper and lower core layers 310 and 330 in order to protect them (from damage, corrosion or the like).

Here, if an Electroless Gold Plating Layer (EGPL) is formed on the upper and lower core layers 310 and 330, the efficiency of the induced magnetic field is improved, so that the power transmission rate can be generally improved.

Under the PCB base 340, a Hanrim Postech Electromagnetic Shield (HPES) 350 is provided in order to prevent an electronic device of an appliance from being influenced by the induced magnetic field. The HPES 350 consists of a shield panel 351, a shield mesh 352, and a metal film 353, which are sequentially laminated on one another.

Here, the shield panel 351 is composed of 25 parts to 55 parts by weight of polyurethane with 55 parts to 75 parts by weight of sendust, wherein sendust is a highly permeable alloy composed of aluminum, silicon, iron or the like, so that the transmission shield panel is constructed using the combination of high shielding performance sendust and polyurethane.

Meanwhile, if the composition of sendust is below 55 parts by weight, the shielding performance may be degraded, whereas if it is more than 75 parts by weight, the performance is not improved in proportion with the input quantity.

The shield mesh 352 serves to reduce the occurrence of eddy current by induced electromotive force created by the induced magnetic field, and is made up of a net-type structured polyester coated with an eddy current reduction composition composed of 35 parts to 45 parts by weight of Zn with 55 parts to 65 parts by weight of Ni, the net structure being made of metal net of 100 meshes to 200 meshes, preferably 135 meshes.

The metal film 353 consists of Al and serves to finally block the magnetic field from the lowermost side of the HPES 350 so that it does not affect a circuit or the like.

When the layer is composed of the plurality of unit cores, the wireless power transmission controller 130 can control the respective unit cores individually so that it is obvious that the series resonance converter 160 is constituted in correspondence with the respective unit cores.

The non-contact power transmission apparatus 100 can be activated by power supplied from a regular power source, a USB port of a notebook, etc. That is, it can be activated by power from various kinds of electronic devices.

Reference will now be made to the non-contact power transmission apparatus 100 of the present invention when actually adapted to electronic devices.

Figure 15:
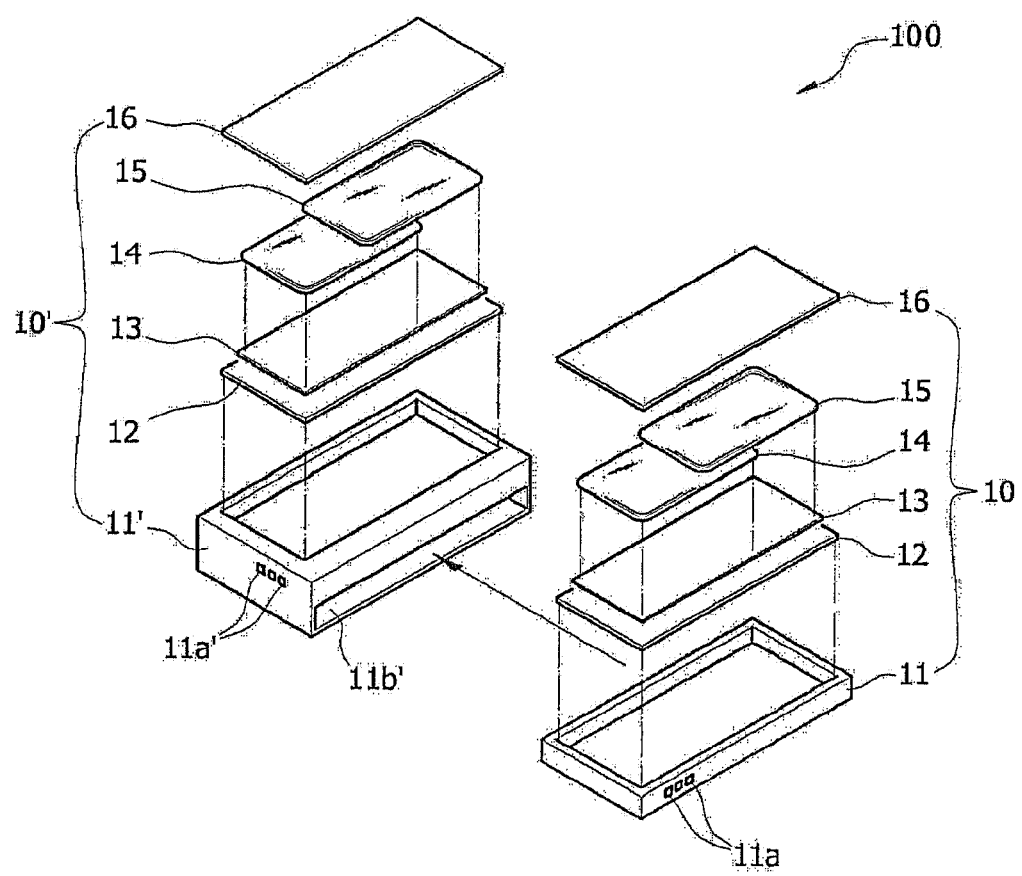
FIG. 15 is an exploded perspective view illustrating the concept of a transmission module, in which major parts of the non-contact power transmission apparatus are formed into a module in accordance with the present invention.

FIG. 15 is an exploded perspective view illustrating the concept of a transmission module 10 in which major parts of the non-contact power transmission apparatus 100 are formed into a module in accordance with the present invention, wherein the transmission module includes a body case 11, a board 12, a shielding plate 13, a first power transmission core 14, a second power transmission core 15, and a cover 16.

The body case 11 includes a hollow section (not designated), in which all of the remaining elements are housed, and a power supply connector (not shown) via which a typical external power source is supplied.

The board 12 comprises a printed circuit board (PCB), in which the respective elements of the noncontact power transmission apparatus 100 shown in FIG. 1 are mounted in a module form.

The shielding plate 13 serves to protect electronic elements on the board 12 from the effects of the wireless power signal transmitted by the first and second power transmission core sides 14 and 15. It may be made of various kinds of materials and have various constructions, as determined by a person skilled in the art.

The first and second power transmission core sides 14 and 15 are formed in a PCB pattern and have a double-core structure, in which two core sides partially overlap each other, as illustrated in FIG. 15, the two core sides respectively transmitting the wireless power signal.

The cover 16 is coupled to the upper portion of the body case 11 so that the non-contact power receiving apparatus, such as a portable terminal P, a battery pack B or the like, is placed thereon. The cover is composed of a material through which the wireless power signals from the first and second power transmission core sides 14 and 15 can be transmitted out.

A light emitting diode (LED) 11a is provided on a side of the body case 11 to display the charging state of the non-contact power receiving apparatus.

Figure 16:
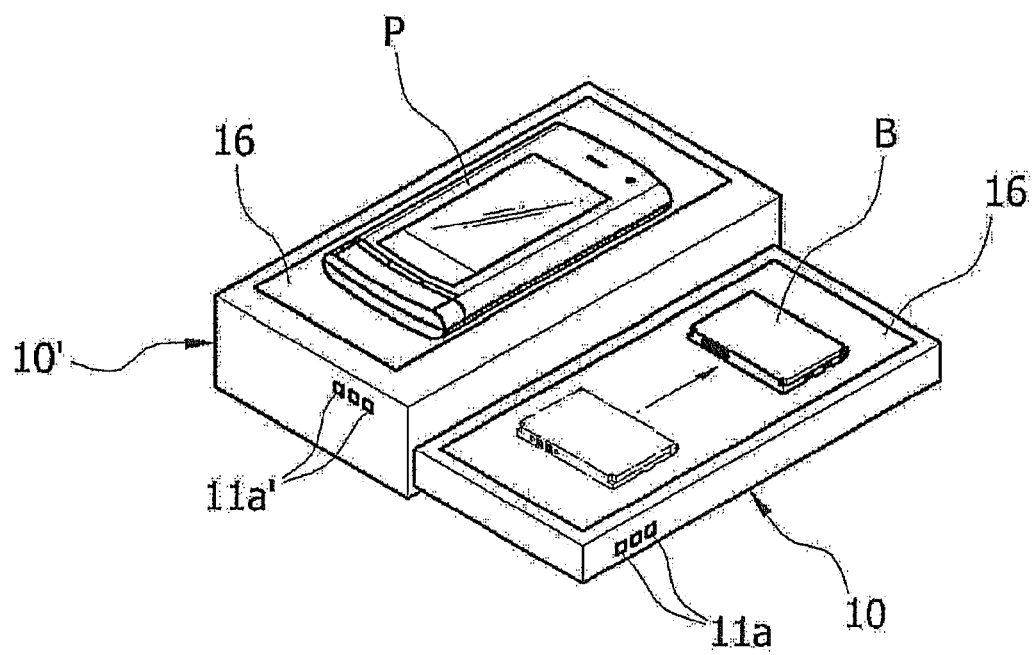
FIGS. 16 and 17 are views illustrating the state of the transmission module of FIG. 15 in use.

As shown in FIG. 15, the transmission module 10 with overlapping double cores comprises two different transmission modules 10 and 10, which are arranged such that one transmission module 10' is provided with a fitting 11b', along which another transmission module 10 detachably slides, thereby enabling simultaneous charging of both the portable terminal P and the battery pack B, as shown in FIG. 16.

Figure 17:
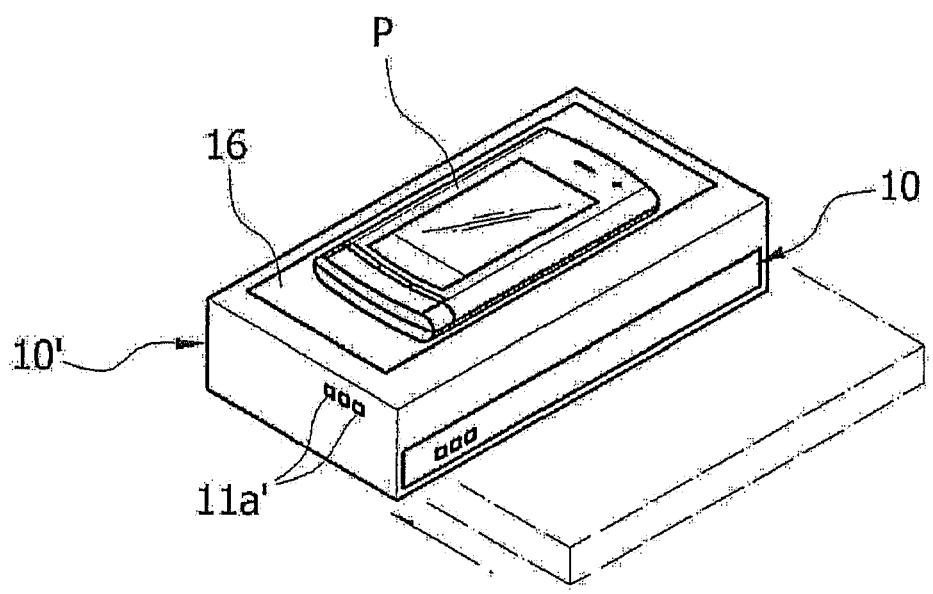

In the case in which only the portable terminal P is charged, as illustrated in FIG. 17, the transmission module 10 for charging the battery pack B is moved into the other transmission module 10', thereby saving space.

Here, unexplained reference number 11a' denotes a light emitting diode provided on a side of another transmission module 10'.

Meanwhile, since the case exists in which the non-contact power receiving apparatus 200, such as the battery pack B, is occasionally moved during the charging process, as shown in FIG. 16, in order to allow the charging process to be conducted stably even if the apparatus 200 moves in this way, the first and second power transmission core sides 14 and 15 are provided in an overlapping form.

That is, the first and second power transmission core sides 14 and 15, which are the primary cores provided in the transmission module 10 for transmitting a wireless power signal, are arranged on the shielding plate 13 such that they have a first single region of only the first power transmission core side 14, a second single region of only the second power transmission core side 15, and an overlapping region, in which the first and second power transmission core sides 14 and 15 overlap each other.

Thus, even if the portable terminal P or the battery pack B is moved as shown in FIG. 16, power can be continuously supplied.

Figure 18:
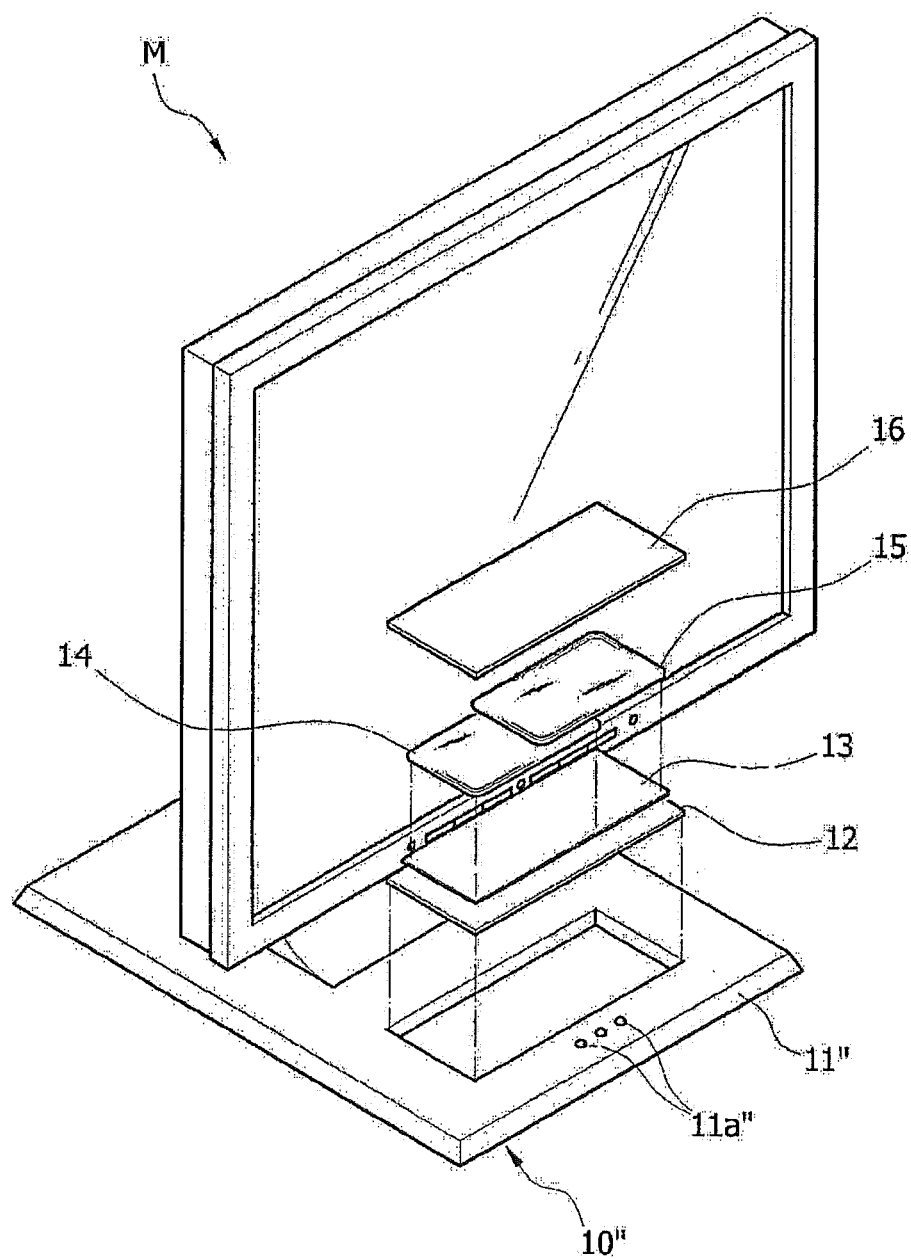
FIGS. 18 to 20 are views illustrating the state of another transmission module in use.
Figure 19:
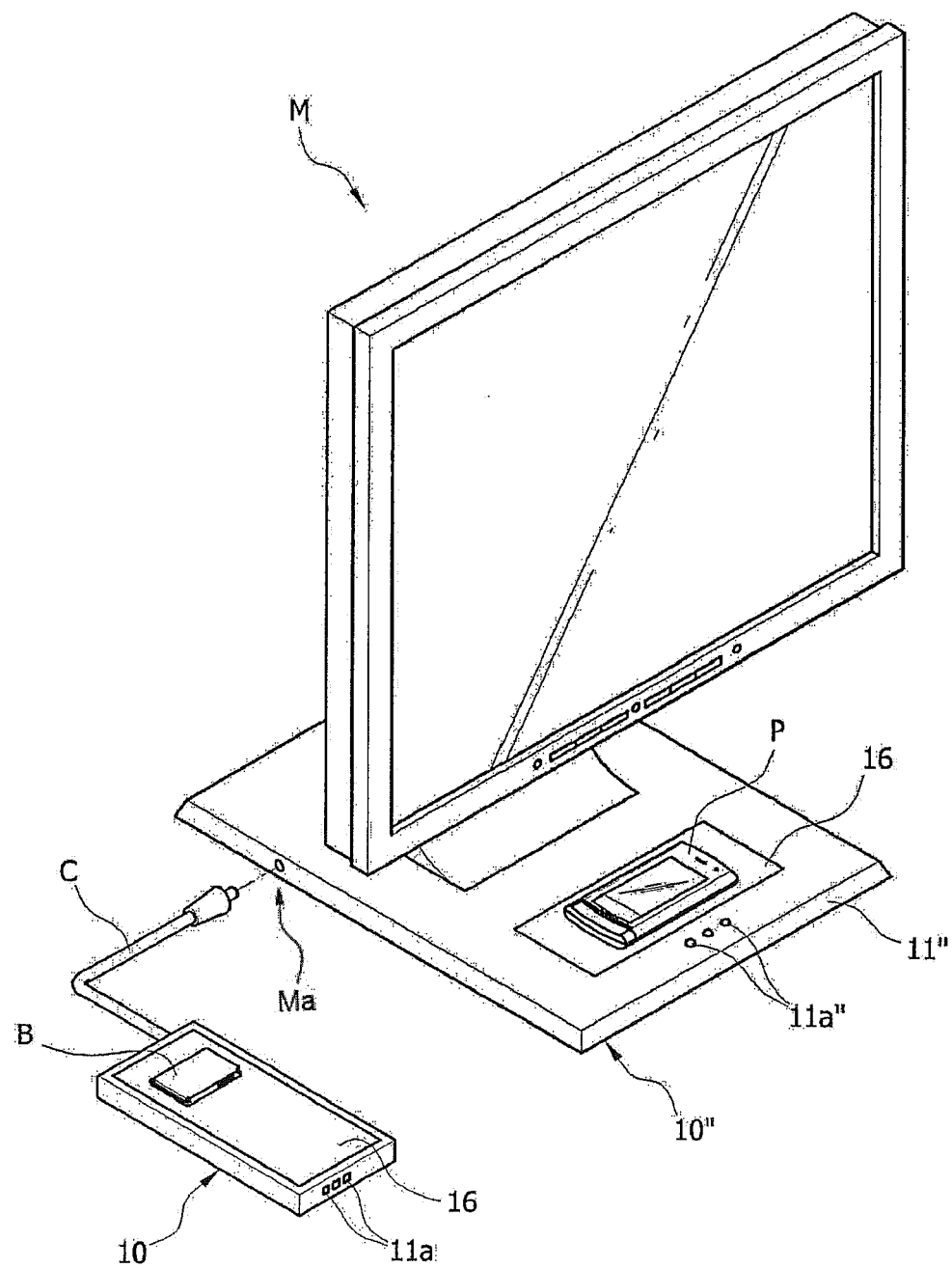
Figure 20:
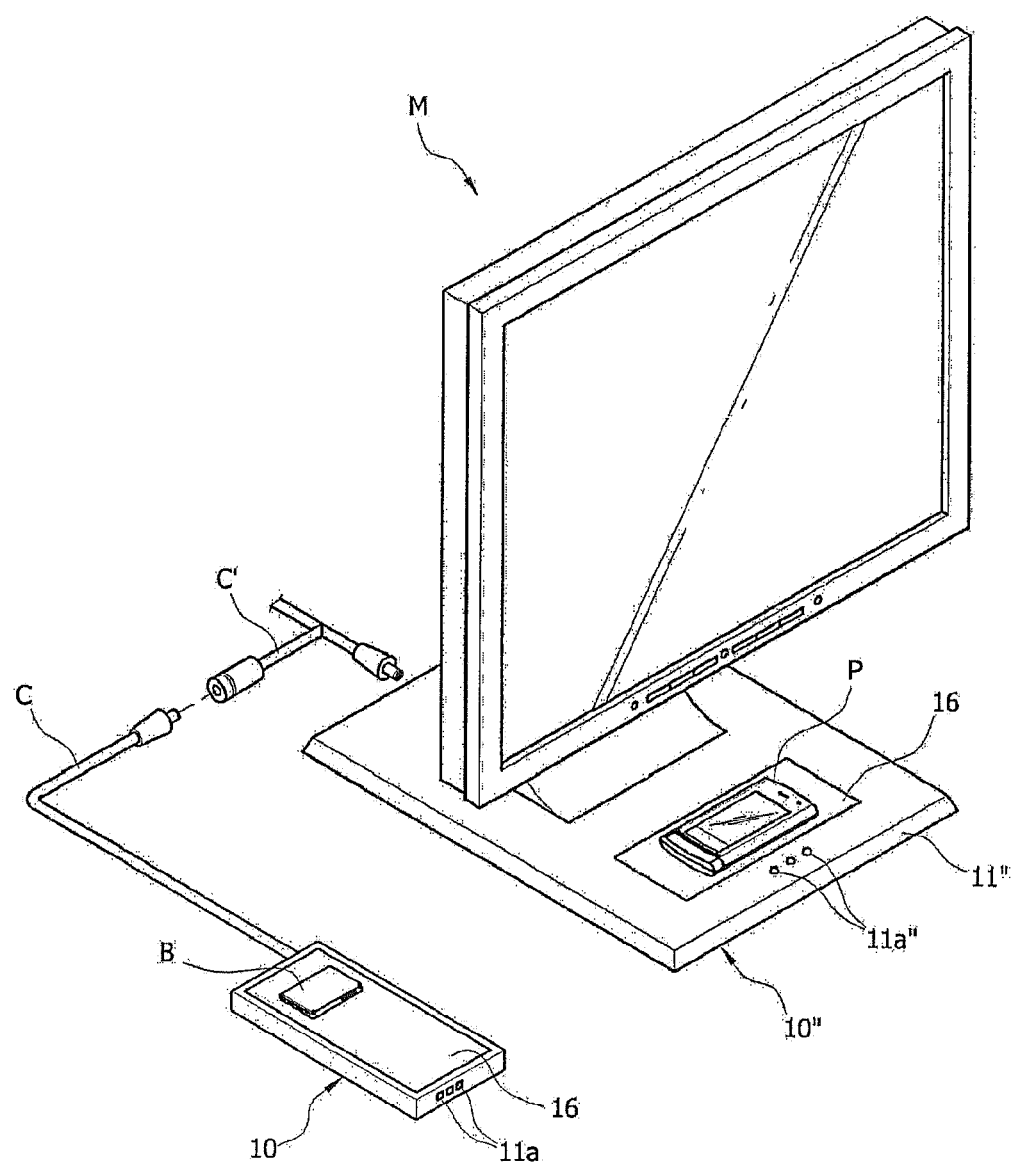

Meanwhile, the transmission module 10 of the non-contact power transmission apparatus 100 can be adapted to a monitor M or the like as shown in FIGS. 18 to 20.

That is, a transmission module 10" may be provided in which the body case 11 of FIG. 1 is used as a monitor support 11" and the board 12, the shielding plate 13, the first and second power transmission core sides 14 and 15, and the cover 16 are provided in the space near the monitor support 11", so that, as shown in FIG. 19, a portable terminal P is placed on the cover 16 and a battery in the portable terminal P is charged. A light emitting diode (LED) 11a" is provided on a side of the monitor support 11" to display the charging state of the non-contact power receiving apparatus 100.

Further, the transmission module 10 of the present invention is connected with a power supply port Ma, which is provided on a side of the monitor M, via a power cable C, so that it can be supplied with driving power distributed from the monitor M.

Further, as illustrated in FIG. 20, the transmission module 10 can be directly supplied with regular power by connecting a power cable C to a connection terminal, which branches from a power cable C' that supplies regular power to the monitor M.

Figure 21:
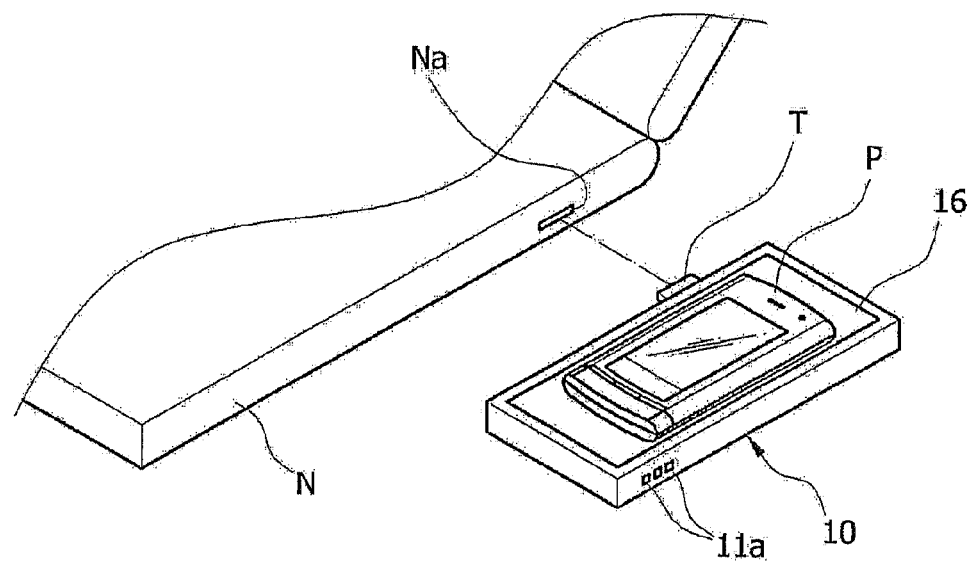
FIG. 21 is a view illustrating the state of still another transmission module in use.

Further, as illustrated in FIG. 21, a connection terminal T is provided on another side of the body case such that it is connected to a connection port Na of an optical disk drive (ODD) of a notebook N, whereby drive power of the transmission module Na can be supplied through the connection port Na.

As set forth before, the transmission module 10 constituted to be connected with the monitor M and the notebook N is provided with a power supply unit (not shown) depending upon the power source that is supplied according to the state of use, but this power supply unit is not limited to any specific form, and may be variously configured according to the kinds of input power sources and demand by a person skilled in the art.

In describing the respective embodiments, while like parts have been denoted with like numerals, in the case of describing like parts as different parts for the convenience of explanation, such as when clearly dividing or individually explaining the respective embodiments, they have been denoted with different numerals.

The non-contact charging system including the non-contact power transmission apparatus of the present invention has been described above. It is understood that the technical construction of the present invention may be modified to have different forms without departing from the spirit and essential features of the present invention by those skilled in the art.

Therefore, the above-mentioned embodiments are provided only for illustrative purposes in all aspects, but are not limited thereto. It should be construed that the scope of the present invention is defined not by the above detailed description, but by the appended claims, and that the described embodiments and all variations or modifications that can be deduced from equivalents interpreted from the claims fall within the scope of the present invention.

What is claimed is:

1. A non-contact power transmission apparatus comprising:
   a board comprising a control module;
   a shielding plate disposed on the board; and
   a primary core located on the shielding plate and configured to electrically connect to the control module, the primary core comprising a first power transmission core and a second power transmission core,
   wherein an overlapping region is formed between the first power transmission core and the second power transmission core,
   wherein the control module is configured to detect an object, and determine that the object is a wireless power receiving device, and
   wherein the primary core is configured to transmit a wireless power signal via at least one of the first power transmission core and the second power transmission core to the wireless power receiving device.

2. The apparatus of claim 1, wherein the control module detects the object based on a change in the load of the primary core.

3. The apparatus of claim 1, wherein the control module is configured to control each of the first power transmission core and the second power transmission core to transmit ID requesting signal.

4. The apparatus of claim 3, wherein the control module is configured to select at least one of the first power transmission core and the second power transmission core.

5. The apparatus of claim 4, wherein the control module is configured to control at least one of the first power transmission core and the second power transmission core to receive ID response signal, and
   wherein the control module selects at least one of the first power transmission core and the second power transmission core which received the ID response signal.

6. The apparatus of claim 4, wherein the control module is configured to control the primary core to transmit the wireless power signal via the selected at least one of the first power transmission core and the second power transmission core.

7. The apparatus of claim 6, wherein if the primary core transmits the wireless power signal via selected both of the first power transmission core and the second power transmission core, the control module controls the sum of output power of the first power transmission core and the second power transmission core to correspond to a predetermined value.

8. The apparatus of claim 6, wherein the wireless power receiving device comprises a power receiving core, and wherein the control module selects both of the first power transmission core and the second power transmission core, if the power receiving core is positioned in the overlapping region.

9. The apparatus of claim 3, wherein the control module determines that the object is the wireless power receiving device based on ID response signal.

10. The apparatus of claim 3, wherein the control module is configured to determine that the object is foreign substance if both of the first power transmission core and the second power transmission core do not receive ID response signal corresponding to the ID requesting signal.

11. The apparatus of claim 4, wherein, the control module is configured to receive a power control requesting signal from the wireless power receiving device and to control an intensity of the wireless power signal based on the power control requesting signal, and the power control requesting signal is generated by comparing the received wireless power signal with a predetermined voltage.

12. A method of transmitting wireless power by a non-contact power transmission apparatus having a primary core comprising:
    detecting an object;
    determining that, the object is a wireless power receiving device; and
    transmitting a wireless power signal to the wireless power receiving device,
    wherein the primary core comprises a first power transmission core and a second power transmission core, an overlapping region is formed between the first power transmission core and the second power transmission core, and the wireless power signal is transmitted via at least one of the first power transmission core and the second power transmission core.

13. The method of claim 12, wherein the object is detected based on a change in the load of the primary core.

14. The method of claim 12, further comprising:
    controlling each of the first power transmission core and the second power transmission core to transmit ID requesting signal.

15. The method of claim 14, further comprising:
    selecting at least one of the first power transmission core and the second power transmission core.

16. The method of claim 15, further comprising:
    controlling at least one of the first power transmission core and the second power transmission core to receive ID response signal, and
    selecting at least one of the first power transmission core and the second power transmission core which received the ID response signal.

17. The method of claim 15, further comprising:
    transmitting the wireless power signal via the selected at least one of the first power transmission core and the second power transmission core.

18. The method of claim 17, further comprising:
    controlling the sum of output power of the first power transmission core and the second power transmission core to correspond to a predetermined value if the wireless power signal is transmitted via both of the first power transmission core and the second power transmission core.

19. The method of claim 17, wherein both of the first power transmission core and the second power transmission core are selected if the power receiving device is positioned in the overlapping region.

20. The method of claim 14, wherein the object is determined as the wireless power receiving device based on ID response signal.

* * * * *